(12) United States Patent
Chaffins et al.

(10) Patent No.: US 11,795,338 B2
(45) Date of Patent: Oct. 24, 2023

(54) THREE-DIMENSIONAL PRINTING

(71) Applicant: HEWLETT-PACKARD DEVELOPMENT COMPANY, L.P., Spring, TX (US)

(72) Inventors: Sterling Chaffins, Corvallis, OR (US); Anthony P. Holden, Corvallis, OR (US); Katrina Donovan, Corvallis, OR (US); Garry Hinch, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 135 days.

(21) Appl. No.: 16/603,342

(22) PCT Filed: Jan. 26, 2018

(86) PCT No.: PCT/US2018/015496
§ 371 (c)(1),
(2) Date: Oct. 7, 2019

(87) PCT Pub. No.: WO2019/147266
PCT Pub. Date: Aug. 1, 2019

(65) Prior Publication Data
US 2021/0087418 A1    Mar. 25, 2021

(51) Int. Cl.
*B29C 64/165* (2017.01)
*C09D 11/38* (2014.01)
(Continued)

(52) U.S. Cl.
CPC ............ *C09D 11/38* (2013.01); *B29C 64/165* (2017.08); *B33Y 70/00* (2014.12); *C09D 11/102* (2013.01);
(Continued)

(58) Field of Classification Search
None
See application file for complete search history.

(56) References Cited

U.S. PATENT DOCUMENTS 6,153,701 A * 11/2000 Potnis ............... C08L 23/10
525/240
6,742,456 B1    6/2004 Kasperchik et al.
(Continued)

FOREIGN PATENT DOCUMENTS

EP        1161492 B1    12/2001
WO    WO-2016-185195 A1 *  11/2016
(Continued)

OTHER PUBLICATIONS

Material Safety Data Sheet—TEGO Wet 510 (www.honourchemical.com) Aug. 23, 2013 (Year: 2013).*
(Continued)

*Primary Examiner* — Mohammad M Ameen
(74) *Attorney, Agent, or Firm* — Dierker & Kavanaugh, P.C.

(57) ABSTRACT

An example of a build material composition for three-dimensional (3D) printing includes a polymeric or polymeric composite build material and a wetting modifying agent. The wetting modifying agent is: (i) incorporated into the polymeric component of the polymeric or polymeric composite build material and changes the wetting behavior of the polymeric component; or (ii) selected from the group consisting of: a fluorotelomer; a $C_8$-$C_{20}$ alcohol; a methyltrialkyl ammonium chloride; docusate sodium salt; a polymer having a chemical structure of the polymeric component of the polymeric or polymeric composite build material modified to include a hydrophobic group or a hydrophilic group; and a combination thereof.

12 Claims, 5 Drawing Sheets

(51) Int. Cl.
  *B33Y 70/00* (2020.01)
  *C09D 11/102* (2014.01)
  *B33Y 10/00* (2015.01)
  *B29K 75/00* (2006.01)
  *B29K 105/00* (2006.01)
  *C08K 3/34* (2006.01)

(52) U.S. Cl.
  CPC .... *B29K 2075/00* (2013.01); *B29K 2105/005* (2013.01); *B33Y 10/00* (2014.12); *C08K 3/346* (2013.01); *C08K 2201/005* (2013.01); *C08K 2201/011* (2013.01)

(56) References Cited

U.S. PATENT DOCUMENTS

| | | |
|---|---|---|
| 7,431,987 B2 | 10/2008 | Pfeifer et al. |
| 7,611,756 B2 | 11/2009 | Pfeifer et al. |
| 2006/0134419 A1 | 6/2006 | Monsheimer et al. |
| 2006/0244169 A1 | 11/2006 | Monsheimer et al. |
| 2011/0069122 A1* | 3/2011 | Shibata .............. C09D 11/38 347/56 |
| 2014/0015894 A1* | 1/2014 | Sisler .............. C09D 133/10 524/561 |
| 2014/0343687 A1 | 11/2014 | Jennissen |

FOREIGN PATENT DOCUMENTS

| | | |
|---|---|---|
| WO | WO2016185195 A1 | 11/2016 |
| WO | WO-2017 196330 A1 * | 11/2017 |
| WO | WO-2017-196330 A1 * | 11/2017 |
| WO | WO2017196330 A1 | 11/2017 |

OTHER PUBLICATIONS

3D Printing: Printing Precision and Application in Food Sector. Equilibrium Saturation in Binder Jetting Additive Manufacturing Processes: Theoretical Model vs. Experimental Observeations. Rapid Prototyping Journal.

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
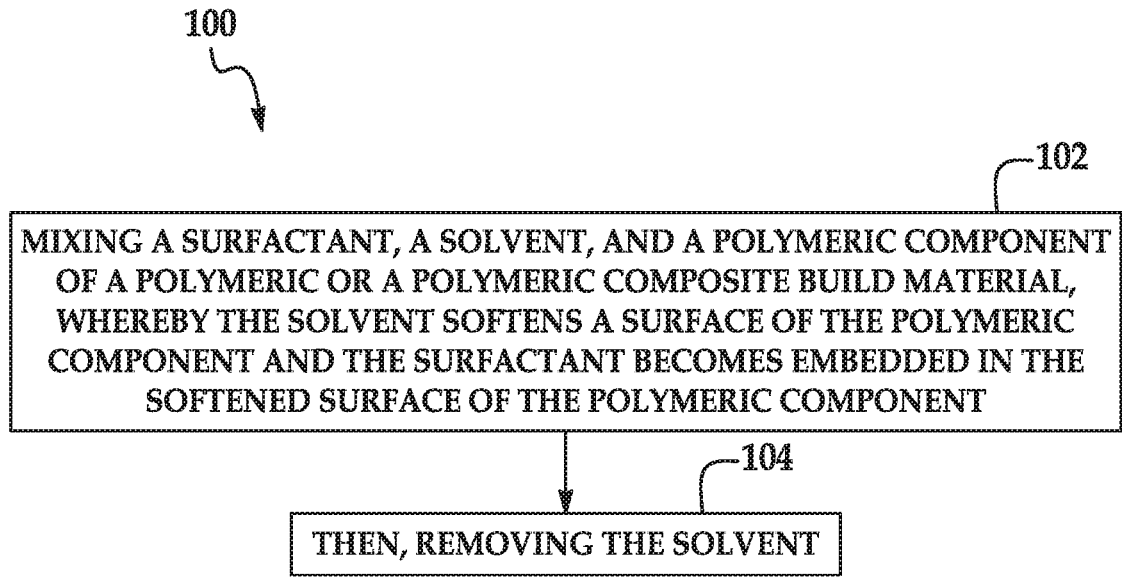
FIG. 1 is a flow diagram illustrating an example of a method of forming an example of a build material composition for 3D printing.

Some examples of three-dimensional (3D) printing may utilize a liquid functional agent, such as a fusing agent including a radiation absorber, to pattern polymeric build material or polymeric composite build material. In these examples, an entire layer of the polymeric or polymeric composite build material is exposed to radiation, but the patterned region (which, in some instances, is less than the entire layer) of the polymeric or polymeric composite build material is fused/coalesced and hardened to become a layer of a 3D object. In the patterned region, the fusing agent is capable of at least partially penetrating into voids between the polymeric or polymeric composite build material particles, and is also capable of spreading onto the exterior surface of the polymeric or polymeric composite build material particles. This fusing agent is capable of absorbing radiation and converting the absorbed radiation to thermal energy, which in turn fuses/coalesces the polymeric or polymeric composite build material that is in contact with the fusing agent.

Other examples of 3D printing may utilize selective laser sintering (SLS) or selective laser melting (SLM). During selective laser sintering or melting, a laser beam is aimed at a selected region (generally less than the entire layer) of a layer of the polymeric or polymeric composite build material. Heat from the laser beam causes the polymeric or polymeric composite build material under the laser beam to fuse. In SLS or SLM, other liquid functional agents may be applied to at least some of the build material prior to laser beam exposure in order to impart a particular property, such as a physical, mechanical and/or electrical property, to the 3D object being formed.

Fusing/coalescing (through the use of the fusing agent or the laser beam) causes the polymeric or polymeric composite build material to join or blend to form a single entity (i.e., the layer of the 3D object/part). Fusing/coalescing may involve at least partial thermal merging, melting, binding, and/or some other mechanism that coalesces the polymeric or polymeric composite build material to form the layer of the 3D part.

Liquid functional agent components, which may include a vehicle and an active material (e.g., a radiation absorber, a conductive material, a semi-conductive material, an insulating material, etc.), may be balanced so that the agent can be inkjetted and so that desirable radiation absorption efficiency is achieved. The characteristics that may contribute to good jettability may also cause the liquid functional agent to exhibit an undesirable wetting behavior on some polymeric or polymeric composite build materials. As an example, the liquid functional agent (including the active material) migrates outside of a desired fill volume. As another example, the liquid functional agent (including the active material) does not migrate sufficiently through a desired fill volume. The migration (or lack thereof) of the liquid functional agent may be the result of the wetting properties of the build material, and the effect that these properties have on the liquid functional agent vehicle when it is applied to the build material. To accommodate the wetting properties of the build material, the vehicle could be altered to increase or decrease its viscosity or to make it more hydrophobic or more hydrophilic, however, such alterations could lead to poor or non-jettability.

Migration of the fusing agent outside of the desired fill volume may cause the polymeric or polymeric composite build material outside of the desired fill volume to fuse/coalesce due to the presence of the radiation absorber outside of the desired fill volume. Fusing/coalescing outside of the desired fill volume may deleteriously affect the surface finish quality and/or accuracy of the 3D part. For example, the surface may be undesirably rough and/or may have an undesirable appearance. As another example, the 3D part may be larger than intended. The migration of the fusing agent may also cause the polymeric or polymeric composite build material in the desired fill volume to under fuse/coalesce due to the loss (through migration) of some of the radiation absorber. Under fusing/coalescing the polymeric or polymeric composite build material in the desired fill volume may reduce the mechanical tolerance(s) and mechanical strength of the 3D part, for example, causing the 3D part to be brittle or fragile.

When the fusing agent does not migrate sufficiently through the desired fill volume, some of the polymeric or polymeric composite build material within the desired fill volume may remain non-fused/non-coalesced due to the radiation absorber not being in contact with that polymeric or polymeric composite build material. Non-fused/non-coalesced polymeric or polymeric composite build material within the desired fill volume may reduce the mechanical tolerance(s) and mechanical strength of the 3D part, and may also deleteriously affect the surface finish quality and/or accuracy of the 3D part. Additionally, when the fusing agent does not migrate sufficiently through the desired fill volume, some other of the polymeric or polymeric composite build material within the desired fill volume may over fuse/coalesce due to the presence of extra radiation absorber (that did not migrate). Over fusing/coalescing the polymeric or polymeric composite build material may deleteriously affect the accuracy of the 3D part. For example, the 3D part may be warped. In some instances, over fusing can also lead to brittle and fragile parts.

Still further, migration of a property-imparting liquid functional agent outside of the desired fill volume may cause the polymeric or polymeric composite build material outside of the desired fill volume to undesirably exhibit the property due to the presence of the active material outside of the desired fill volume. For example, a liquid functional agent including a conductive material may be used to form a metal trace in a part being formed via SLS. Liquid functional agent migration may cause the conductive material to spread to a portion of the build material that is to be fused, but that is not to be part of the trace (i.e., beyond a defined area for the metal trace). In this example, a portion of the part beyond the defined area for the trace may undesirably exhibit the conductive property.

Build Material Compositions

Disclosed herein is a build material composition including a wetting modifying agent. The wetting modifying agent changes/modifies the wetting behavior of the build material composition (as compared to a comparable build material composition including all of the components of the build material composition except for the wetting modifying agent). As such, the wetting modifying agent may prevent the active material (e.g., as part of the liquid functional agent) from moving beyond the desired fill volume and/or may cause the active material (e.g., as part of the liquid functional agent) to penetrate all or substantially all of the desired fill volume. Thus, the wetting modifying agent may allow for the production of a 3D part with improved surface finish quality, accuracy, mechanical tolerance, mechanical strength and/or desired properties in defined areas (as compared to a 3D part printed according to a comparable method for 3D printing but without using the wetting modifying agent).

As used herein, the term "wetting behavior" refers to the ability of a build material composition to allow a liquid (e.g., the fusing agent) to penetrate into voids between the build material particles and/or to spread onto the exterior surface of the build material particles.

As used herein, the term "desired fill volume" refers to the volume of build material that corresponds to a portion of a 3D object model (i.e., in the digital domain) of the 3D part.

In the examples disclosed herein, the build material composition includes a polymeric or polymeric composite build material and the wetting modifying agent. In some examples, the build material composition may include additional components, such as an antioxidant, a brightener, a charging agent, a flow aid, or a combination thereof. In other examples, the build material composition consists of the polymeric or polymeric composite build material and the wetting modifying agent without any additional components.

In one example, the build material composition for three-dimensional (3D) printing comprises: a polymeric or polymeric composite build material; and a wetting modifying agent, wherein the wetting modifying agent is incorporated into the polymeric component of the polymeric or polymeric composite build material, and wherein the wetting modifying agent changes a wetting behavior of the polymeric component of the polymeric or polymeric composite build material.

As used herein, "incorporated into" the build material may mean embedded in the surface of the build material, extruded or compounded so that the agent becomes part of the bulk build material, and/or attached to the surface of the build material. Surface treating the build material with the wetting modifying agent may be used to embed the wetting modifying agent in the surface of the build material or attach the wetting modifying agent to the surface of the build material.

In another example, the build material composition for three-dimensional (3D) printing comprises: a polymeric or polymeric composite build material; and a wetting modifying agent selected from the group consisting of: a fluorotelomer; a $C_8$-$C_{20}$ alcohol; a methyltrialkyl ammonium chloride; docusate sodium salt; a polymer having a chemical structure of a polymeric component of the polymeric or polymeric composite build material modified to include a hydrophobic group or a hydrophilic group; and a combination thereof.

In still another example, the build material composition for three-dimensional (3D) printing comprises: a polymeric or polymeric composite build material; and a wetting modifying agent, wherein the wetting modifying agent is: (i) incorporated into the polymeric component of the polymeric or polymeric composite build material and changes the wetting behavior of the polymeric component; or (ii) selected from the group consisting of: a fluorotelomer; a polymer having a chemical structure of the polymeric component of the polymeric or polymeric composite build material modified to include a hydrophobic group or a hydrophilic group; and a combination thereof.

The polymeric or polymeric composite build material may be a polymeric build material or a polymeric composite build material. As used herein, the term "polymeric build material" may refer to crystalline or semi-crystalline polymer. As used herein, the term "polymeric composite build material" may refer to composite material made up of polymer and ceramic.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the polymeric build material include polyethylene, polypropylene, and polyoxomethylene (i.e., polyacetals). Still other examples of suitable polymeric build materials include polystyrene, polycarbonate, polyester, polyurethanes (e.g., thermoplastic polyurethane), other engineering plastics, and blends of any two or more of the polymers listed herein.

Any of the previously listed crystalline or semi-crystalline polymers may be combined with ceramic material to form the polymeric composite build material. Examples of suitable ceramic material include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic material that may be combined with the crystalline or semi-crystalline polymer may depend on the materials used and the 3D part to be formed. In one example, the ceramic material may be present in an amount ranging from about 1 wt % to about 40 wt % based on the total weight of the polymeric composite build material.

In some examples, the polymeric or polymeric composite build material may be in the form of a powder. In other examples, the polymeric or polymeric composite build material may be in the form of a powder-like material, which includes, for example, short fibers having a length that is greater than its width. In some examples, the powder may be formed from, or may include, short fibers that may, for example, have been cut into short lengths from long strands or threads of material.

The polymeric or polymeric composite build material may have a melting point or softening point ranging from about 50° C. to about 400° C. Depending upon the composition of the composite, the melting or softening point may be higher or lower. As an example, the polymeric or polymeric composite build material may be a polyamide having a melting point of about 180° C.

The polymeric or polymeric composite build material may be made up of similarly sized particles or differently sized particles. In an example, the average particle size of the polymeric or polymeric composite build material ranges from about 2 μm to about 200 μm. In another example, the average particle size of the polymeric or polymeric composite build material ranges from about 20 μm to about 90 μm. In still another example, the average particle size of the polymeric or polymeric composite build material is about 60 μm. The term "particle size", as used herein, refers to the diameter of a spherical particle, or the average diameter of a non-spherical particle (i.e., the average of multiple diameters across the particle), or the volume-weighted mean diameter of a particle distribution.

The build material composition also includes the wetting modifying agent. The wetting modifying agent i) is capable of changing/modifying the wetting behavior of the build material composition (as compared to a comparable build material composition including all of the components of the build material composition except for the wetting modifying agent), and ii) does not react with the polymeric or polymeric composite build material. The wetting modifying agent may also be selected so that it does not interfere with or degrade the flow properties of the build material and/or so that it does not interfere with the mechanical properties of the 3D part that is formed. The selection of the wetting agent depends, in part, on the inherent wetting behavior of the build material and the liquid functional agent that is to be applied to the build material. For example, if the build material is hydrophobic or relatively non-wetting and the liquid functional agent is hydrophilic, the wetting modifying agent may be selected to render the build material more hydrophilic in order to increase wetting and increase the flow of the liquid functional agent into the build material. For another example, if the build material is hydrophilic or wets excessively and the liquid functional agent is also relatively hydrophilic, the wetting modifying agent may be selected to render the build material more hydrophobic in order to decrease wetting and slow the flow of the liquid functional agent into the build material. In some examples herein, build material with a contact angle (CA) value less than 90° may be considered to be hydrophilic, and build material with a contact angle (CA) value greater than 90° may be considered to be hydrophobic.

In the examples disclosed herein, the wetting modifying agent is (i) incorporated into the polymeric component of the polymeric or polymeric composite build material and changes the wetting behavior of the polymeric component; or (ii) selected from the group consisting of: a fluorotelomer; a $C_8$-$C_{20}$ alcohol; a methyltrialkyl ammonium chloride; docusate sodium salt; a polymer having a chemical structure of the polymeric component of the polymeric or polymeric composite build material modified to include a hydrophobic group or a hydrophilic group; and a combination thereof.

In some examples, the wetting modifying agent is: incorporated into the polymeric component by being embedded in the surface of the polymeric component; and a surfactant. Examples of suitable surfactants include a silicone-free defoamer (e.g., BKY-054™ available from BYK Additives & Instruments), a branched secondary alcohol ethoxylate (e.g., TERGITOL™ TMN-6 available from The Dow Chemical Company), a self-emulsifiable, nonionic wetting agent based on acetylenic diol chemistry (e.g., SURFYNOL® SE-F from Air Products and Chemicals, Inc.), and a polyether siloxane (e.g., TEGO® Wet 510 available from Evonik). Other examples of suitable surfactants include long-chain alkyl glucosides (e.g., with a $C_8$-$C_{20}$ chain length), such as decyl glucoside (e.g., commercially available as ECOSENSE™ 3000 surfactant from Dow Chemical Co.). Still other examples of suitable surfactants include ionic surfactants, such as sodium dodecylsulfonate (SDS) and sodium lauryl ether sulfate (SLES).

The surfactant embedded in the surface of the polymeric component of the polymeric or polymeric composite build material may increase the hydrophilicity of the polymeric component, and thus of the build material composition, when the surfactant includes a hydrophobic tail and a hydrophilic head group. The increased hydrophilicity may change/modify the wetting behavior of the build material composition such that a hydrophilic liquid (e.g., the fusing agent or other liquid functional agent) may penetrate further into the build material composition (as compared to a comparable build material composition including all of the components of the build material composition except for the wetting modifying agent).

The surfactant embedded in the surface of the polymeric component of the polymeric or polymeric composite build material may increase the hydrophobicity of the polymeric component, and thus of the build material composition, when the surfactant includes a hydrophilic tail and a hydrophobic head group. The increased hydrophobicity may change/modify the wetting behavior of the build material composition such that penetration of a hydrophilic liquid (e.g., the fusing agent or other liquid functional agent) into the build material composition is limited (e.g., penetration is less when compared to a comparable build material composition including all of the components of the build material composition except for the wetting modifying agent).

In some other examples, the wetting modifying agent is incorporated into the polymeric component, and the wetting modifying agent is selected from the group consisting of silica nanopowder, polyvinyl alcohol, polyethylene glycol, and a combination thereof. The silica nanopowder, the polyvinyl alcohol, and/or the polyethylene glycol, incorporated into the polymeric component of the polymeric or polymeric composite build material, may increase the hydrophilicity of the polymeric component, and thus of the build material composition. The increased hydrophilicity may change/modify the wetting behavior of the build material composition such that a hydrophilic liquid (e.g., the fusing agent or other liquid functional agent) may penetrate further into the build material composition (as compared to a comparable build material composition including all of the components of the build material composition except for the wetting modifying agent).

In still some other examples, the wetting modifying agent is selected from the group consisting of a fluorotelomer, a $C_8$-$C_{20}$ alcohol, a methyltrialkyl ammonium chloride, docusate sodium salt, a polymer having a chemical structure of the polymeric component of the polymeric or polymeric composite build material modified to include a hydrophobic group or a hydrophilic group, and a combination thereof. In some of these examples, the wetting modifying agent is incorporated into the polymeric component, and is selected from the group consisting of the fluorotelomer, the $C_8$-$C_{20}$ alcohol, the methyltrialkyl ammonium chloride, docusate sodium salt, and a combination thereof. In others of these examples, these wetting modifying agents may be mixed with the build material particles. It has been found that the listed agents i) are capable of changing/modifying the wetting behavior of the build material composition, and ii) do not react with the polymeric or polymeric composite build material.

In some examples, the wetting modifying agent includes the fluorotelomer. In an example, the fluorotelomer may have a chemical structure of:

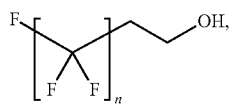

where n is an integer ranging from 6 to 24. An example of this fluorotelomer is 2-(perfluoroalkyl)ethyl stearate, commercially available as ZONYL® FTS (available from DuPont). In another example, the fluorotelomer may have a chemical structure of:

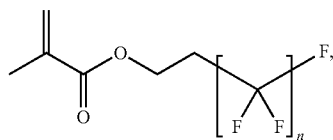

where n is an integer ranging from 6 to 24. An example of this fluorotelomer is commercially available as ZONYL® FSP (available from DuPont). In still another example, the fluorotelomer may have a chemical structure of:

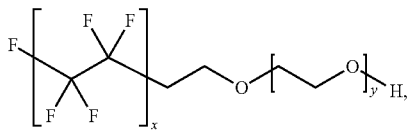

where x is an integer ranging from 6 to 24, and y is an integer ranging from 1 to 4. An example of this fluorotelomer is commercially available as ZONYL® FSO (available from DuPont). In yet another example, the fluorotelomer may have a chemical structure of:

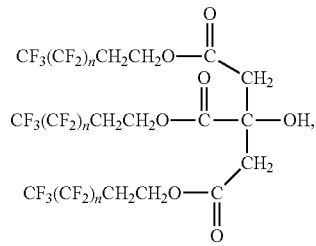

where n is an integer ranging from 5 to 23. An example of this fluorotelomer is commercially available as ZONYL® TBC (available from DuPont).

The fluorotelomer may be a solid that is added to (e.g., incorporated into or mixed with) the build material particles, and may increase the hydrophobicity of the build material composition during 3D printing when it melts to form a liquid that spreads onto the surface of the build material particles. The increased hydrophobicity may change/modify the wetting behavior of the build material composition such that penetration of a hydrophilic liquid (e.g., the fusing agent or other liquid functional agent) into the build material composition is limited (e.g., penetration is less when compared to a comparable build material composition including all of the components of the build material composition except for the wetting modifying agent).

In some examples, the wetting modifying agent includes the $C_8$-$C_{20}$ alcohol. One example of the $C_8$-$C_{20}$ alcohol is octadecanol (also known as stearyl alcohol). Octadecanol has a chemical structure of: $CH_3(CH_2)_{16}CH_2OH$.

The $C_8$-$C_{20}$ alcohol may be a liquid or a solid that is added to (e.g., incorporated into or mixed with) the build material particles, and may increase the hydrophobicity of the build material composition. As an example, octadecanol is a solid that may be mixed with the build material particles. As another example, some of the shorter chain alcohols may be liquids, and these alcohols may be used to treat the surface of the build material particles or may be extruded or compounded to become part of the bulk build material particles. The increased hydrophobicity may change/modify the wetting behavior of the build material composition such that penetration of a hydrophilic liquid (e.g., the fusing agent or other liquid functional agent) into the build material composition is limited (e.g., penetration is less when compared to a comparable build material composition including all of the components of the build material composition except for the wetting modifying agent).

In some examples, the wetting modifying agent includes a methyltrialkyl ammonium chloride. Examples of the methyltrialkyl ammonium chloride may have a chemical structure of:

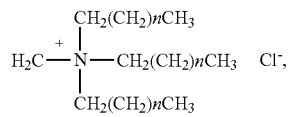

where n is an integer ranging from 6 to 8. An example of this methyltrialkyl ammonium chloride is commercially available as ADOGEN® 464 (available from Evonik).

The methyltrialkyl ammonium chloride may be a solid that is added to (e.g., incorporated into or mixed with) the build material particles, and may increase the hydrophobicity of the build material composition. The increased hydrophobicity may change/modify the wetting behavior of the build material composition such that penetration of a hydrophilic liquid (e.g., the fusing agent or other liquid functional agent) into the build material composition is limited (e.g., penetration is less when compared to a comparable build material composition including all of the components of the build material composition except for the wetting modifying agent).

In some examples, the wetting modifying agent includes docusate sodium salt. Docusate sodium salt has a chemical structure of:

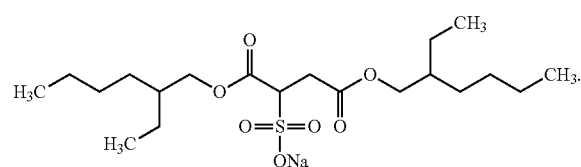

Docusate sodium salt may be a solid that is added to (e.g., incorporated into or mixed with) the build material particles, and may increase the hydrophilicity of the build material composition. The increased hydrophilicity may change/modify the wetting behavior of the build material composition such that a hydrophilic liquid (e.g., the fusing agent or other liquid functional agent) may penetrate further into the build material composition (as compared to a comparable build material composition including all of the components of the build material composition except for the wetting modifying agent).

In some examples, the wetting modifying agent includes the polymer having the chemical structure of the polymeric component of the polymeric or polymeric composite build material modified to include a hydrophobic group or a hydrophilic group. The hydrophobic group or a hydrophilic group may be incorporated into the polymeric component by several different techniques, examples of which are described in reference to FIG. 2.

Examples of hydrophobic groups include an alkylsilane group, silicone linkages, a perfluoroalkyl group, and a combination thereof. In a specific example, a polyurethane or a polybutadiene may be modified with an alkylsilane group. The hydrophobic groups may increase the hydrophobicity of the build material composition, and the increased hydrophobicity may change/modify the wetting behavior of the build material composition such that penetration of a hydrophilic liquid (e.g., the fusing agent or other liquid functional agent) into the build material composition is limited (e.g., penetration is less when compared to a comparable build material composition including all of the components of the build material composition except for the wetting modifying agent).

Examples of hydrophilic groups include amino groups, alcohol groups, alkoxy groups, carboxylate groups, carboxylic acid groups, and ether linkages, glycol linkages, and a combination thereof. In an example, the modified polymer may be a hydrophilic silane, such as 3-cyanoethyltriethoxysilane or bis(2-hydroxethyl)-3-aminopropyl-triethyoxysilane. When the modified polymer is 3-cyanoethyltriethoxysilane, the hydrophilic group is the cyano group; and when the modified polymer is bis(2-hydroxethyl)-3-aminopropyl-triethyoxysilane, the hydrophilic group is the hydroxyethyl group.

The hydrophilic groups may increase the hydrophilicity of the build material composition, and the increased hydrophilicity may change/modify the wetting behavior of the build material composition such that a hydrophilic liquid (e.g., the fusing agent or other liquid functional agent) penetrates further into the build material composition (as compared to a comparable build material composition including all of the components of the build material composition except for the wetting modifying agent).

The effect of the wetting modifying agent in the build material composition (i.e., causing an increase or a decrease the penetration of a liquid) has been described herein in terms of a hydrophilic liquid. However, it is to be understood that when a hydrophobic liquid is used the opposite effect is achieved. For example, increasing the hydrophilicity of the build material composition may change/modify the wetting behavior of the build material composition such that penetration of a hydrophobic liquid (e.g., the fusing agent or other liquid functional agent) into the build material composition is limited (e.g., penetration is less when compared to a comparable build material composition including all of the components of the build material composition except for the wetting modifying agent). As another example, increasing the hydrophobicity of the build material composition may change/modify the wetting behavior of the build material composition such that a hydrophobic liquid (e.g., the fusing agent or other liquid functional agent) penetrates further into the build material composition (as compared to a comparable build material composition including all of the components of the build material composition except for the wetting modifying agent).

When the wetting modifying agent is the fluorotelomer, the $C_8$-$C_{20}$ alcohol, the methyltrialkyl ammonium chloride, docusate sodium salt, or the modified polymer, the wetting modifying agent may initially be a solid particle mixed with the build material particles. In these examples, the wetting modifying agent may be disposed on surfaces of the polymeric or polymeric composite build material, disposed in voids between the polymeric or polymeric composite build material, or a combination thereof. In a specific example, the wetting modifying agent includes the fluorotelomer, the $C_8$-$C_{20}$ alcohol, the methyltrialkyl ammonium chloride, docusate sodium salt, or a combination thereof, and the wetting modifying agent is disposed on surfaces of the polymeric or polymeric composite build material, disposed in voids between the polymeric or polymeric composite build material, or a combination thereof. In another specific example, the wetting modifying agent includes the polymer having the chemical structure of the polymeric component modified to include the hydrophobic group or the hydrophilic group, and is mixed among the polymeric or polymeric composite build material.

In examples where the wetting modifying agent is a solid particle, the wetting modifying agent has an average particle size ranging from about 10 nm to about 50 μm. In another of these examples, the wetting modifying agent has an average particle size ranging from about 10 nm to about 100 nm. Alternatively, the wetting modifying agent may have an average particle size similar to (e.g., within 10% of) the average particle size of the polymeric or polymeric composite build material. For example, the wetting modifying agent includes the polymer having the chemical structure of the polymeric component modified to include the hydrophobic group or the hydrophilic group, and the wetting modifying agent has an average particle size ranging from about 2 μm to about 200 μm.

In still some other examples, the wetting modifying agent is incorporated into the polymeric component, and the wetting modifying agent is silica nanopowder, polyvinyl alcohol, polyethylene glycol, the fluorotelomer, the $C_8$-$C_{20}$ alcohol, the methyltrialkyl ammonium chloride, docusate sodium salt, or the hydrophobic-modified or hydrophilic-modified polymer. Silica nanopowder, polyvinyl alcohol, polyethylene glycol, the fluorotelomer, the $C_8$-$C_{20}$ alcohol, the methyltrialkyl ammonium chloride, docusate sodium salt, or the hydrophobic-modified or hydrophilic-modified polymer may be incorporated in the bulk build material during fabrication of the build material. In this example, silica nanopowder, polyvinyl alcohol, polyethylene glycol, the fluorotelomer, the $C_8$-$C_{20}$ alcohol, the methyltrialkyl ammonium chloride, docusate sodium salt, or the hydrophobic-modified or hydrophilic-modified polymer may be included as an additive in the bulk build material. When the build material particles are formed, the surface modifying agent additive may be present within and at the surface of the build material particles.

As mentioned above, the wetting modifying agent changes/modifies the wetting behavior of the build material composition. As such, the wetting modifying agent may prevent the fusing agent from penetrating beyond the desired fill volume of the build material composition and/or may cause the fusing agent to penetrate all or substantially all of the desired fill volume. In some examples, the wetting modifying agent may change the surface properties of the build material. Depending upon the properties (e.g., hydrophilicity or hydrophobicity) of the wetting modifying agent and the properties (e.g., hydrophilicity or hydrophobicity) of the liquid functional agent, the interaction between the liquid functional agent and the wetting modifying agent can reduce or prevent the liquid functional agent migration or can improve the liquid functional agent migration. For example, a hydrophilic wetting modifying agent can reduce or prevent hydrophobic liquid functional agent migration and can improve the hydrophilic liquid functional agent migration. As another example, a hydrophobic wetting modifying agent can reduce or prevent hydrophilic liquid functional agent migration and can improve the hydrophobic liquid functional agent migration.

The wetting modifying agent may be included in the build material composition is an amount sufficient to achieve the desired change/modification of the wetting behavior. If not enough or if too much of the wetting modifying agent is included, the active material (when applied via the liquid functional agent) may penetrate into the build material composition beyond the desired fill volume or may not penetrate all or substantially all of the desired fill volume. Additionally, too much of the wetting modifying agent may deleteriously affect the cost of the build material composition, the properties of the build material composition (e.g., flowability), and/or the properties of a 3D part printed using the build material composition (e.g., part definition, surface quality, and/or mechanical strength).

In an example, the wetting modifying agent is incorporated into the polymeric component (e.g., into the bulk polymeric component composition), and the wetting modifying agent is present in the build material composition in an amount ranging from about 0.5 wt % to about 5 wt %, based on the total weight of the build material composition. In another example (e.g., when the wetting modifying agent is the fluorotelomer), the wetting modifying agent is incorporated into the polymeric component, and the wetting modifying agent is present in the build material composition in an amount ranging from about 0.5 wt % to about 2 wt %, based on the total weight of the build material composition. A larger amount of wetting modifying agent may be included in the build material composition when the wetting modifying agent is incorporated into the polymeric component because the amount of the wetting modifying agent that resides inside the polymeric component may be unable to contribute to the change/modification of the wetting behavior of the polymeric component. In these examples, the wetting modifying agent that remains exposed on the surface of the polymeric component will affect the change/modification of the wetting behavior. As such, it may be desirable to incorporate more of the wetting modifying agent into the bulk polymeric component composition during fabrication of the particles so that more of the wetting modifying agent ends up on the surface of the polymeric or polymeric composite particles.

In an example, the wetting modifying agent is embedded in the surface of the polymeric component, and the wetting modifying agent is present in the build material composition in an amount ranging from about 0.01 wt % to about 5 wt %, based on the total weight of the build material composition. In another example (e.g., when the wetting modifying agent is the fluorotelomer), the wetting modifying agent is embedded in the surface of the polymeric component, and the wetting modifying agent is present in the build material composition in an amount ranging from about 0.01 wt % to about 0.05 wt %, based on the total weight of the build material composition.

In still another example, the wetting modifying agent includes the fluorotelomer, the $C_8$-$C_{20}$ alcohol, the methyltrialkyl ammonium chloride, docusate sodium salt, or a combination thereof, (as external particles mixed with the polymeric or polymeric composite build material), and the wetting modifying agent is present in the build material composition in an amount ranging from about 0.01 wt % to about 0.05 wt %, based on the total weight of the build material composition. In yet another example, the wetting modifying agent includes the polymer having the chemical structure of the polymeric component modified to include the hydrophobic group or the hydrophilic group (as external particles mixed with the polymeric or polymeric composite build material), and the wetting modifying agent is present in the build material composition in an amount ranging from about 0.5 wt % to about 5.0 wt %, based on the total weight of the build material composition.

As mentioned above, in some examples, the build material composition, in addition to the polymeric or polymeric composite build material and the wetting modifying agent, may include an antioxidant, a brightener, a charging agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polymeric or polymeric composite build material and/or may prevent or slow discoloration (e.g., yellowing) of the polymeric or polymeric composite build material by preventing or slowing oxidation of the polymeric or polymeric composite build material. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). In an example, the antioxidant may be included in the build material composition in an amount ranging from about 0.01 wt % to about 5 wt %, based on the total weight of the build material composition.

Brightener(s) may be added to the build material composition to improve visibility. Examples of suitable brighteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), and combinations thereof. In some examples, a stilbene derivative may be used as the brightener. In these examples, the temperature(s) of the 3D printing process may be selected so that the stilbene derivative remains stable (i.e., the 3D printing temperature does not thermally decompose the stilbene derivative). In an example, the brightener may be included in the build material composition in an amount ranging from about 0.01 wt % to about 10 wt %, based on the total weight of the build material composition.

Charging agent(s) may be added to the build material composition to suppress tribo-charging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt %, based upon the total weight of the build material composition.

Flow aid(s) may be added to improve the coating flowability of the build material composition. Flow aids may be particularly beneficial when the polymeric or polymeric composite build material has an average particle size less than 25 μm. The flow aid improves the flowability of the polymeric or polymeric composite build material by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt %, based upon the total weight of the build material composition.

Methods for Making the Build Material Compositions

Referring now to FIG. 1, disclosed herein is a method 100 of forming an example of the build material composition 16 for 3D printing. The method 100 may be used to form the build material composition 16 that includes the wetting modifying agent embedded in the surface of the polymeric component of the polymeric or polymeric composite build material.

As shown in FIG. 1, one example of the method 100 comprises: mixing a surfactant, a solvent, and a polymeric component of a polymeric or polymeric composite build material, whereby the solvent softens a surface of the polymeric component and the surfactant becomes embedded in the softened surface of the polymeric component (reference numeral 102); and then, removing the solvent (reference numeral 104).

As shown at reference numeral 102, the method 100 includes mixing the surfactant, the solvent, and the polymeric component. The surfactant may be any of the surfactants listed above as examples of the wetting modifying agent. The solvent may be any solvent that is a partial solvent of the polymeric component, and thus is capable of softening the surface of the polymeric component. Examples of the solvent include combinations of water and a co-solvent. Examples of the co-solvent include alcohols (e.g., methanol, ethanol, isopropanol, etc.), diols (e.g., 1,5-pentanediol, ethylene glycol, etc.), (e.g., methyl ethyl ketone (MEK), acetone, etc.), cyclic ethers (e.g., tetrahydrofuran (THF), 4-dioxane, etc.), and combinations thereof. Each of the water and the co-solvent may be included in amounts such that the polymeric component is softened but not dissolved. The polymeric component may include any of the polymeric build materials listed above. In some examples (e.g., when the build material composition is to include the polymeric composite build material), a ceramic material may also mixed with the surfactant, the solvent, and the polymeric component.

The solvent softens the surface of the polymeric component and the surfactant becomes embedded in the softened surface of the polymeric component. In some examples of the method 100, as the solvent softens and the surfactant becomes embedded, the mixture of the surfactant, the solvent, and the polymeric component is heated to a temperature ranging from about 30° C. to about 100° C. In an example, the temperature is about 40° C. In other examples of the method 100, as the solvent softens and the surfactant becomes embedded, the mixture of the surfactant, the solvent, and the polymeric component is sonicated. Sonication may assist a surfactant or a portion of the surfactant in making contact with the polymeric component. In an example, sonication may be used to assist a nonpolar portion of the surfactant in making contact with the polymeric component when a polar solvent is used.

In some examples of the method 100, the solvent softens the surface of the polymeric component and the surfactant becomes embedded in the softened surface of the polymeric component in a time period ranging from about 0.1 hours to about 8 hours. In an example, the time period is about 30 minutes. In another example, the time period is about 60 minutes. In some of these examples, the solvent is removed from the polymeric component with the surfactant embedded therein immediately after the desired time period has passed.

As shown at reference numeral 104, after the solvent softens the surface of the polymeric component and the surfactant becomes embedded in the softened surface of the polymeric component, the method 100 includes removing the solvent. The solvent may be removed with any process that removes the solvent without deleteriously affecting the polymeric component or the surfactant. In an example, the solvent may be removed using a centrifuge, a vacuum, heat, or a combination thereof. When heat is used, the solvent may be heated to a temperature ranging from about 25° C. to about 100° C.

The surfactant embedded polymeric component may also be exposed to a washing process and/or to a sequence of solvents either before or after solvent removal. The washing process and/or the sequence of solvents may be used to remove any surfactant that was not embedded in the polymeric component and/or the solvent and/or to remove any other impurities. The sequence of solvents may involve increasingly more volatile solvents that are then easier to remove under vacuum. The sequence of solvents may also include solvents that will not dissolve the polymeric component and will not extract the surfactant from the surface of the polymeric component within the time period that the surfactant embedded polymeric component is exposed to the solvents. In an example, the sequence of solvents may include first water, then ethanol, then methanol.

In some examples of the method 100, prior to the mixing of the surfactant, the solvent, and the polymeric component, the polymeric component is exposed to a plasma treatment. The polymeric component may be exposed to a plasma treatment to provide a temporary negative charge on the surface of the polymeric component so that water or another polar solvent may be used to deliver the surfactant to the surface of the polymeric component.

In some examples of the method 100, after the solvent is removed, the polymeric component with the surfactant embedded therein may be mixed with ceramic material to form the polymeric composite build material. In other examples of the method 100, after the solvent is removed, the polymeric component with the surfactant embedded therein may be mixed with the antioxidant, the brightener, the charging agent, the flow aid, or a combination thereof. The mixing may be accomplished by any suitable means. For example, the mixing may be accomplished with a mixer (e.g., an industrial paddle mixer, an industrial high shear mixer, a resonant acoustic mixer, etc.).

In the examples disclosed herein, it is to be understood that the mixing may be performed in the printer 10 (see FIG. 5), or in a separate powder management station. As examples, mixing in the printer 10 may take place on the build area platform 12 (see FIGS. 4A and 5), in the build material supply 14 (see FIGS. 4A and 5), or in a separate mixing station. In some examples, the separate printing station may be set up to deliver the mixed build material 16 to the supply 14 and/or platform 12.

In one example of the method 100, the polymeric component is a thermoplastic polyurethane powder and is mixed with a sufficient amount of a solution of about 0.2 wt % BYK-054™ (i.e., the surfactant, a silicone-free defoamer available from BYK Additives & Instruments) in methanol (i.e., the solvent) to saturate the thermoplastic polyurethane powder. The mixture of the thermoplastic polyurethane powder and the solution is maintained at a temperature of about 40° C. for about 30 minutes, which is sufficient for the solvent to soften the surface of the polymeric component and the surfactant to become embedded in the softened surface of the polymeric component. The solvent is removed from the polymeric component with the surfactant embedded therein, for example, by first using centrifugal separation and then using a vacuum.

In one other example of the method 100, the polymeric component is a thermoplastic polyurethane powder and is exposed to a plasma treatment to provide a temporary negative charge on the surface of the thermoplastic polyurethane powder. The thermoplastic polyurethane powder is then mixed with a sufficient amount of a solution of about 0.3 wt % decyl glucoside (i.e., the surfactant) in water (i.e., the solvent) to saturate the thermoplastic polyurethane powder. The mixture of the thermoplastic polyurethane powder and the solution is sonicated and maintained at a temperature of about 40° C. for about 60 minutes, which is sufficient for the solvent to soften the surface of the polymeric component and the surfactant to become embedded in the softened surface of the polymeric component. The solvent is removed from the polymeric component with the surfactant embedded therein, for example, by first using centrifugal separation and then using a vacuum.

To form the polymeric component with the wetting modifying agent incorporated therein, the wetting modifying agent may be included as an additive in the bulk polymeric material. The material may be processed to form powder, fibers, etc., that have the wetting modifying agent residing therein and near the surface thereof. In an example, the bulk polymeric material, including the wetting modifying agent, may be used as feedstock in an extrusion process to produce a powder or other powder-like material (e.g., a pellet). In another example, the polymeric component is melted and then the wetting modifying agent is mixed into the melt to form a compounded material. The compounded material may then be extruded to produce a powder or other powder-like material.

Figure 2:
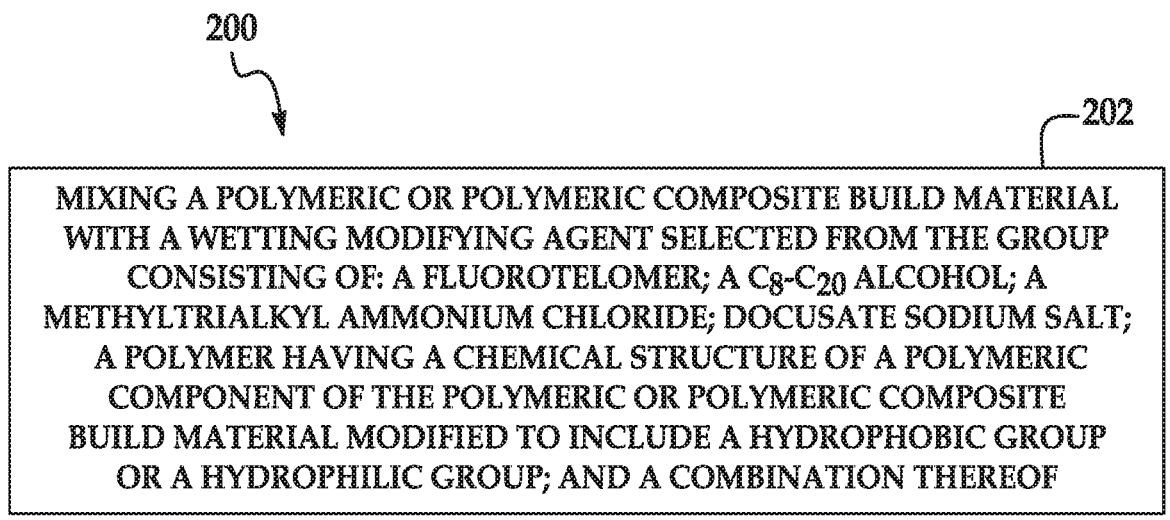
FIG. 2 is a diagram illustrating another example of a method of forming another example of a build material composition for 3D printing.

Referring now to FIG. 2, disclosed herein is another example of a method 200 of forming another example of a build material composition 16 for 3D printing. The method 200 may be used to form the build material composition 16 when the wetting modifying agent is the fluorotelomer and/or the polymer having the chemical structure of the polymeric component modified to include a hydrophobic group or a hydrophilic group.

As shown in FIG. 2, one example of the method 200 comprises: mixing a polymeric or polymeric composite build material with a wetting modifying agent selected from the group consisting of: a fluorotelomer; a $C_8$-$C_{20}$ alcohol; a methyltrialkyl ammonium chloride; docusate sodium salt; a polymer having a chemical structure of a polymeric component of the polymeric or polymeric composite build material modified to include a hydrophobic group or a hydrophilic group; and a combination thereof (reference numeral 202). The mixing may be accomplished by any suitable means. For example, the polymeric or polymeric composite build material may be mixed with the wetting modifying agent using a mixer (e.g., an industrial paddle mixer, an industrial high shear mixer, a resonant acoustic mixer, a ball mill, a powder mill, a jet mill, etc.). In some examples (e.g., when a jet mill is used), the mixer may be used for the mixing and may also be used to reduce the particle size of the polymeric or polymeric composite build material and/or the wetting modifying agent. In these examples, the components may have a larger particle size at the beginning of the mixing process and may have a particle size within the desired range for the build material composition 16 at the end of the mixing process.

When the build material composition 16 includes the antioxidant, the brightener, the charging agent, the flow aid, or a combination thereof, the method 200 may include mixing the antioxidant, the brightener, the charging agent, the flow aid, or a combination thereof with the polymeric or polymeric composite build material and the wetting modifying agent. Alternatively, the polymeric or polymeric composite build material may be obtained (e.g., purchased) with the antioxidant, the brightener, the charging agent, the flow aid, or a combination thereof mixed therein.

In the examples disclosed herein, it is to be understood that the mixing may be performed in the printer 10, or in a separate powder management station. As examples, mixing in the printer 10 may take place on the build area platform 12, in the build material supply 14, or in a separate mixing station. In some examples, the separate printing station may be set up to deliver the mixed build material 16 to the supply and/or platform 12.

When the wetting modifying agent includes the polymer having the chemical structure of the polymeric component modified to include a hydrophobic group or a hydrophilic group, the method 200 may include synthesizing the wetting modifying agent.

The wetting modifying agent may be synthesized with hydrophobic groups, such an alkylsilane group, silicone linkages, a perfluoroalkyl group, and a combination thereof. For example, a modified polyurethane may be synthesized by reacting a diisocyanate (e.g., an aromatic diisocyanate or an aliphatic diisocyanate) with a diol (e.g., a linear aliphatic polyol). The hydrophobicity of the polyurethane may be increased by using an aromatic diisocyanate with an alkyl substitution (any alkyl may be used, e.g., a $C_4$-$C_{20}$ alkyl) and/or a diol with a longer aliphatic chain (e.g., a diol of the structure HO—$(CH_2)$n-OH, where n is an integer ranging from 4 to 20). In an example, the modified polyurethane may be synthesized according to the chemical reaction:

Additionally or alternatively, the hydrophobicity of the polyurethane may be increased through functionalization with silicon coupling agents. For example, an aminosilane may react with isocyanate end groups on a polyurethane to form alkoxysilane groups, which can be hydrolyzed (e.g., with water and a tin catalyst) to produce a urethane copolymer with silicone (Si—O—Si) linkages. As another example, an isocyanate-functionalized silane may react with hydroxyl end groups on a polyurethane oligomer (e.g., with a molecular weight ranging from about 300 to about 6000) to form alkoxysilane groups, which can be hydrolyzed (e.g., with water and a tin catalyst) to produce a urethane copolymer with silicone (Si—O—Si) linkages. The silicone linkages (in either example) may increase the hydrophobicity of the polyurethane. As still another example, a chlorosilane may react with an amine group of the polyurethane to introduce an N—$SiR_3$ group, where each R is hydrogen or a hydrocarbon (e.g., with a $C_1$-$C_{20}$ chain length). The N—$SiR_3$ group provides hydrophobicity to the polyurethane.

Alternatively, the wetting modifying agent may be synthesized with hydrophilic groups including amino groups, alcohol groups, alkoxy groups, carboxylate groups, carboxylic acid groups, ether linkages, glycol linkages, and a combination thereof. For example, a modified polyamide may be synthesized by reacting an adipic acid with a diamine and an ether. In an example, the modified polyamide may be synthesized according to the chemical reaction:

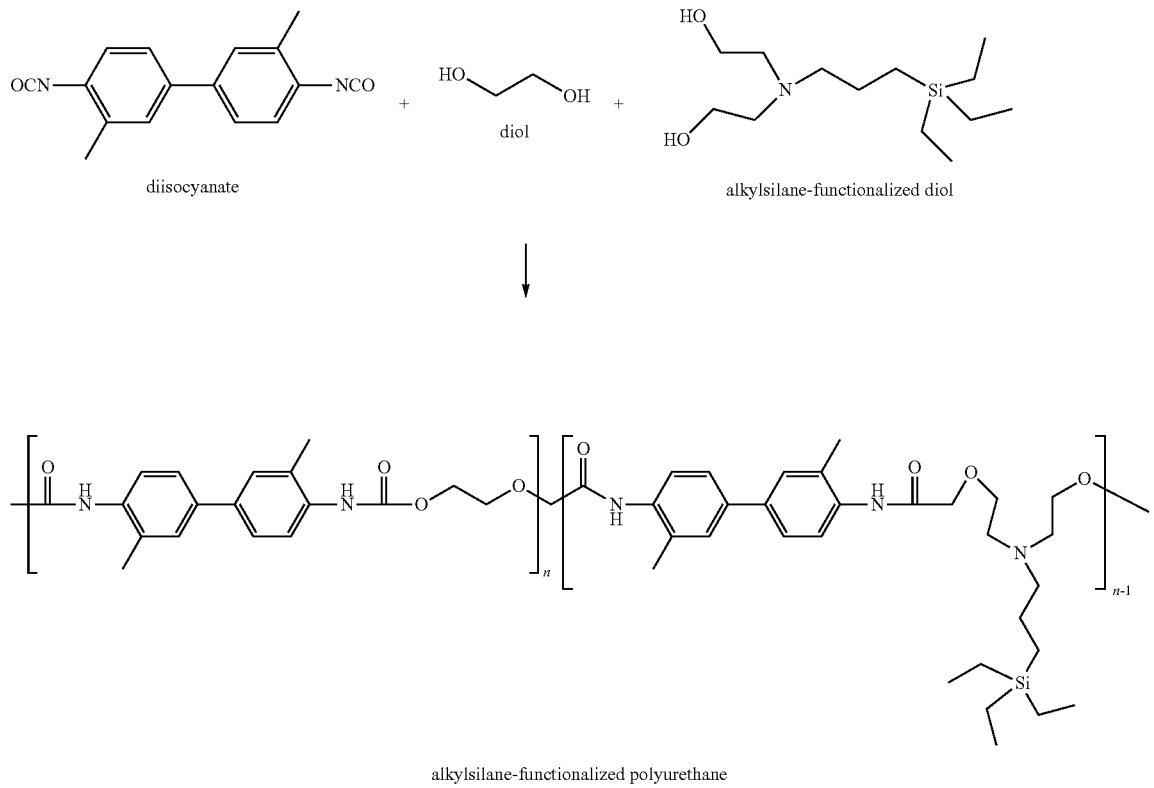

alkylsilane-functionalized polyurethane

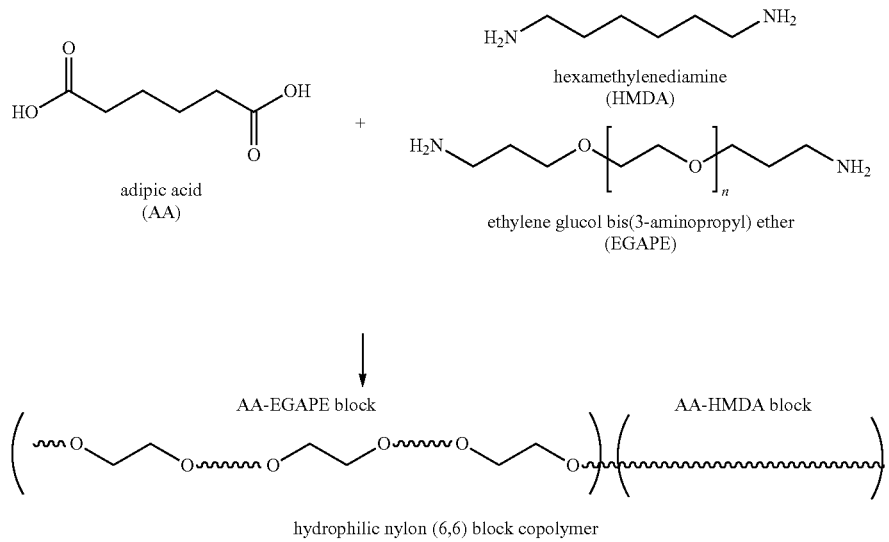

Printing Methods

Referring now to FIG. 3 and FIGS. 4A through 4E, an example of a method 300, 400 for 3D printing is depicted. Prior to execution of the method 300, 400 or as part of the method 300, 400, a controller 30 (see, e.g., FIG. 5) may access data stored in a data store 32 (see, e.g., FIG. 5) pertaining to a 3D part that is to be printed. The controller 30 may determine the number of layers of the build material composition 16 that are to be formed and the locations at which the fusing agent 26 from the applicator 24 is to be deposited on each of the respective layers.

Briefly, the method 300 for three-dimensional (3D) printing comprises: applying a build material composition 16 to form a layer 38, the build material composition 16 including: a polymeric or polymeric composite build material; and a wetting modifying agent initially mixed with the build material as part of the build material composition 16 or selectively applied to at least a portion 40 of the layer 38; wherein the wetting modifying agent: (i) becomes incorporated into the polymeric component of the polymeric or polymeric composite build material and changes the wetting behavior of the polymeric component; or (ii) is selected from the group consisting of: a fluorotelomer; a polymer having a chemical structure of the polymeric component of the polymeric or polymeric composite build material modified to include a hydrophobic group or a hydrophilic group; and a combination thereof; (reference numeral 302); based on a 3D object model, selectively applying a liquid functional agent 26 on the at least the portion 40 of the build material composition 16, wherein the wetting modifying agent controls the penetration of the liquid functional agent 26 (reference numeral 304); and based on the 3D object model, forming a 3D part layer from at least the portion of the build material composition (reference numeral 306).

While not shown, the method 300, 400 may include forming the build material composition 16. In an example, the build material composition 16 is formed prior to applying the build material composition 16. The build material composition 16 may be formed in accordance with the method 100 or the method 200 or by incorporating the modifying wetting agent as an additive during formation of the bulk polymeric component. The polymeric or polymeric composite build material and the wetting modifying agent may each be as described above. In this example of the method 300, 400, the build material composition 16 may also include the antioxidant, the brightener, the charging agent, the flow aid, or combinations thereof.

Figure 3:
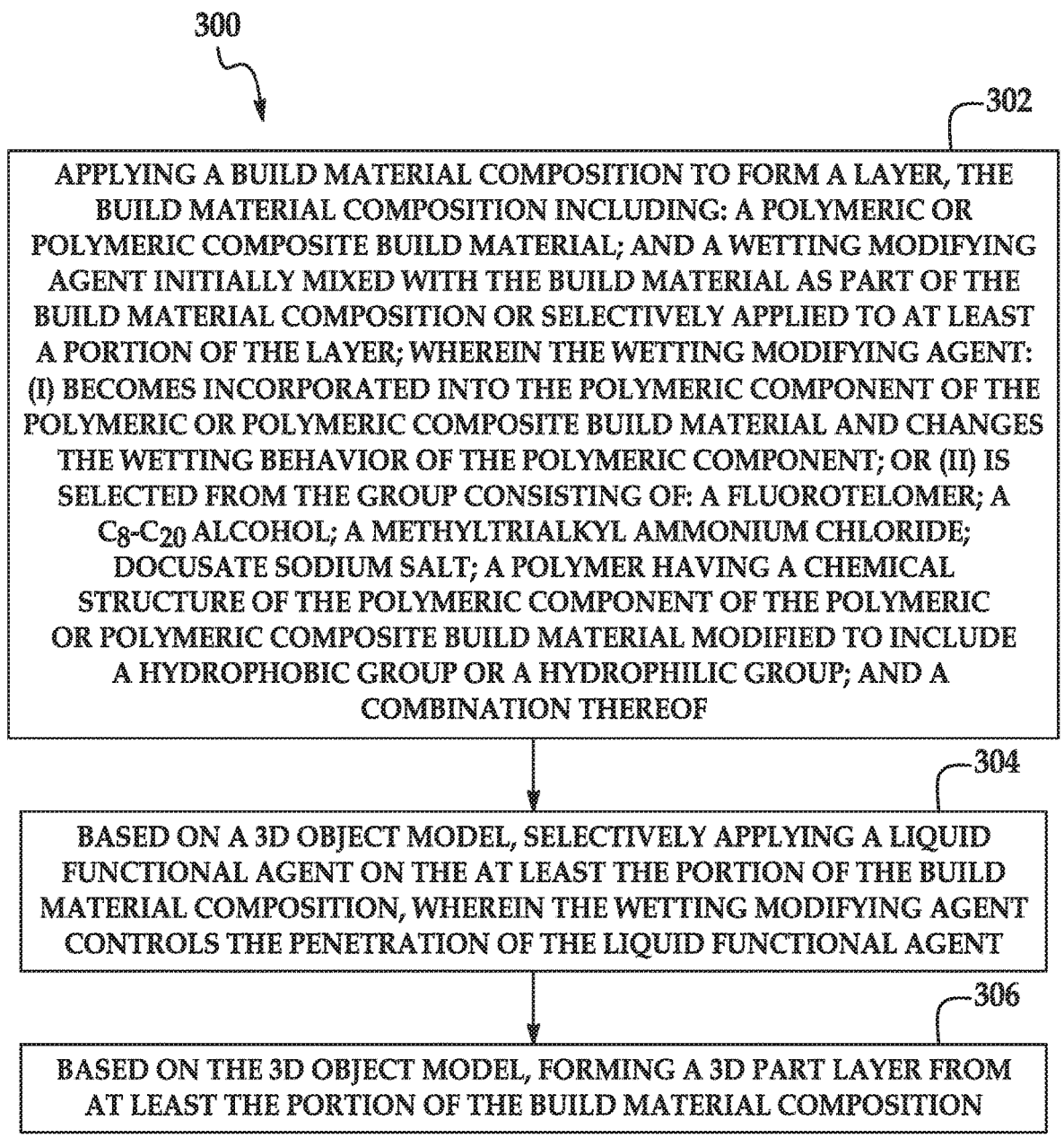
FIG. 3 is a flow diagram illustrating an example of a method for 3D printing.
Figure 4A:
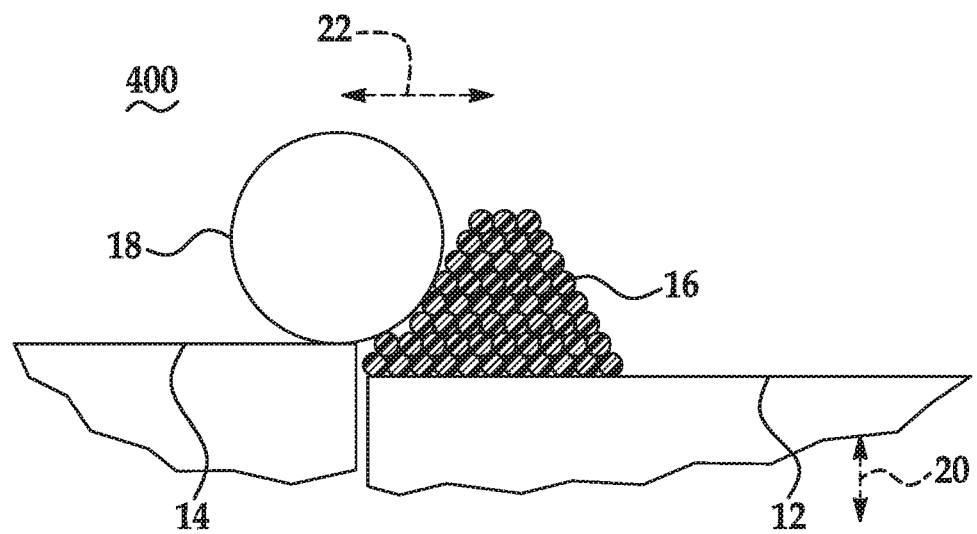
FIGS. 4A through 4E are schematic and partially cross-sectional cutaway views depicting the formation of a 3D object using an example of the 3D printing method disclosed herein.
Figure 4B:
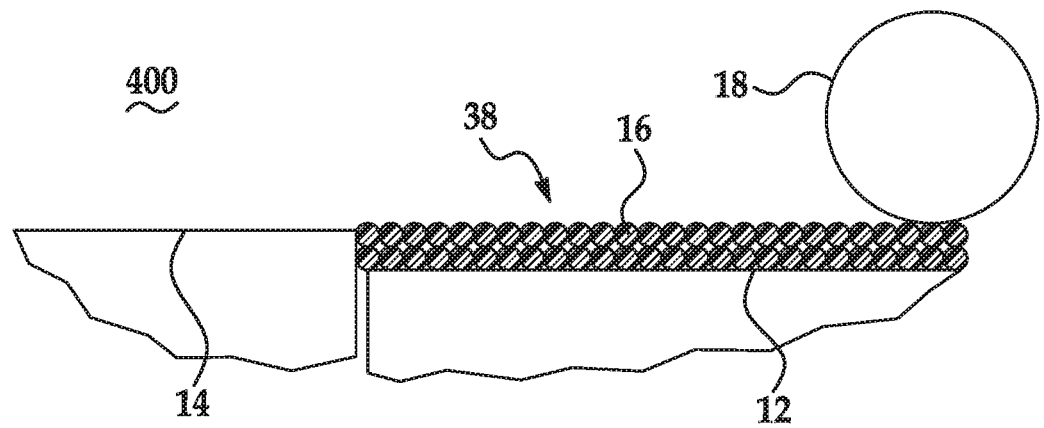

As shown at reference numeral 302 in FIG. 3 and in FIGS. 4A and 4B, the method 300, 400, includes applying the build material composition 16. In the example shown in FIGS. 4A and 4B, a printing system (e.g., printing system 10 shown in FIG. 5) may be used to apply the build material composition 16. The printing system 10 may include a build area platform 12, a build material supply 14 containing the build material composition 16, and a build material distributor 18.

In some examples, applying the build material composition 16 may involve spreading examples of the already formed build material composition 16 onto the build area platform 12. In other examples, applying the polymeric or polymeric composite build material (which does not include the wetting modifying agent) may involve spreading the polymeric or polymeric composite build material onto the build area platform 12, and then applying the wetting modifying agent to form the build material composition 16.

The build area platform 12 receives the build material (without the wetting modifying agent) or the build material composition 16 (which already includes the wetting modifying agent) from the build material supply 14. The build area platform 12 may be moved in the directions as denoted by the arrow 20, e.g., along the z-axis, so that the build material or the build material composition 16 may be delivered to the build area platform 12 or to a previously formed layer 46. In an example, when the build material or the build material composition 16 is to be delivered, the build area platform 12 may be programmed to advance (e.g., downward) enough so that the build material distributor 18 can push the build material or the build material composition 16 onto the build area platform 12 to form a substantially uniform layer 38 of the build material or the build material composition 16 thereon. The build area platform 12 may also be returned to its original position, for example, when a new part is to be built.

The build material supply 14 may be a container, bed, or other surface that is to position the build material composition between the build material distributor 18 and the build area platform 12.

The build material distributor 18 may be moved in the directions as denoted by the arrow 22, e.g., along the y-axis, over the build material supply 14 and across the build area platform 12 to spread the layer 38 of the build material or the build material composition 16 over the build area platform 12. The build material distributor 18 may also be returned to a position adjacent to the build material supply 14 following the spreading of the build material or the build material composition 16. The build material distributor 18 may be a blade (e.g., a doctor blade), a roller, a combination of a roller and a blade, and/or any other device capable of spreading the build material composition 16 over the build area platform 12. For instance, the build material distributor 18 may be a counter-rotating roller. In some examples, the build material supply 14 or a portion of the build material supply 14 may translate along with the build material distributor 18 such that the build material or the build material composition 16 is delivered continuously to the material distributor 18 rather than being supplied from a single location at the side of the printing system 10 as depicted in FIG. 4A.

As shown in FIG. 4A, the build material supply 14 may supply the build material or the build material composition 16 into a position so that it is ready to be spread onto the build area platform 12. The build material distributor 18 may spread the supplied build material or build material composition 16 onto the build area platform 12. The controller 30 may process control build material supply data, and in response control the build material supply 14 to appropriately position the build material particles or the build material composition 16 particles, and may process control spreader data, and in response, control the build material distributor 18 to spread the supplied build material or build material composition 16 over the build area platform 12 to form the layer 38 thereon. As shown in FIG. 4B, one build material layer 38 has been formed.

The layer 38 of the build material or the build material composition 16 has a substantially uniform thickness across the build area platform 12. In an example, the thickness of the build material layer 38 is about 100 μm. In another example, the thickness of the build material layer 38 ranges from about 30 μm to about 300 μm, although thinner or thicker layers may also be used. For example, the thickness of the build material layer 38 may range from about 20 μm to about 500 μm, or from about 50 μm to about 80 μm. The layer thickness may be about 2× (i.e., 2 times) the particle diameter (as shown in FIG. 4B) at a minimum for finer part definition. In some examples, the layer thickness may be about 1.2× the particle diameter.

In some examples of the method disclosed herein, the build material (without the wetting modifying agent) is applied as previously described, and then the wetting modifying agent is selectively applied to at least a portion 40 of the build material layer 38. In these examples, a wetting modifying agent supply (not shown) may selectively deliver the wetting modifying agent to the same portion 40 that is to have the liquid functional agent 26 applied thereto. The wetting modifying agent may be delivered to the build material via a liquid vehicle, in which the wetting modifying agent is dispersed or dissolved. When a liquid vehicle is used to deliver the wetting modifying agent to the portion 40, the selective application of the wetting modifying agent may be performed as described herein for the selective application of the liquid functional agent 26. Additionally, the liquid vehicle containing the wetting modifying agent may be any formulation of the LFA vehicle described below in reference to the liquid functional agent 26. The liquid vehicle containing the wetting modifying agent may be modified (to increase or decrease its viscosity or to make it more hydrophobic or more hydrophilic) so that it achieves a desired wetting behavior on the build material. It is to be understood that the formulation of the liquid vehicle used to deliver the wetting modifying agent may depend, in part, on the wetting modifying agent used, the wetting characteristics of the build material, the applicator to be used to apply the wetting modifying agent, etc.

After the build material composition 16 has been applied, and prior to further processing, the build material layer 38 may be exposed to heating. Heating may be performed to pre-heat the build material composition 16, and thus the heating temperature may be below the melting point or softening point of the build material composition 16. As such, the temperature selected will depend upon the build material composition 16 that is used. As examples, the pre-heating temperature may be from about 5° C. to about 50° C. below the melting point or softening point of the polymeric or polymeric composite build material. In an example, the pre-heating temperature ranges from about 50° C. to about 250° C. In another example, the pre-heating temperature ranges from about 150° C. to about 170° C.

Pre-heating the layer 38 of the build material composition 16 may be accomplished by using any suitable heat source that exposes all of the build material composition 16 on the build area platform 12 to the heat. Examples of the heat source include a thermal heat source (e.g., a heater (not shown) integrated into the build are platform 12 (which may include sidewalls)) or the radiation source 34, 34' (see, e.g., FIG. 5).

Figure 4C:
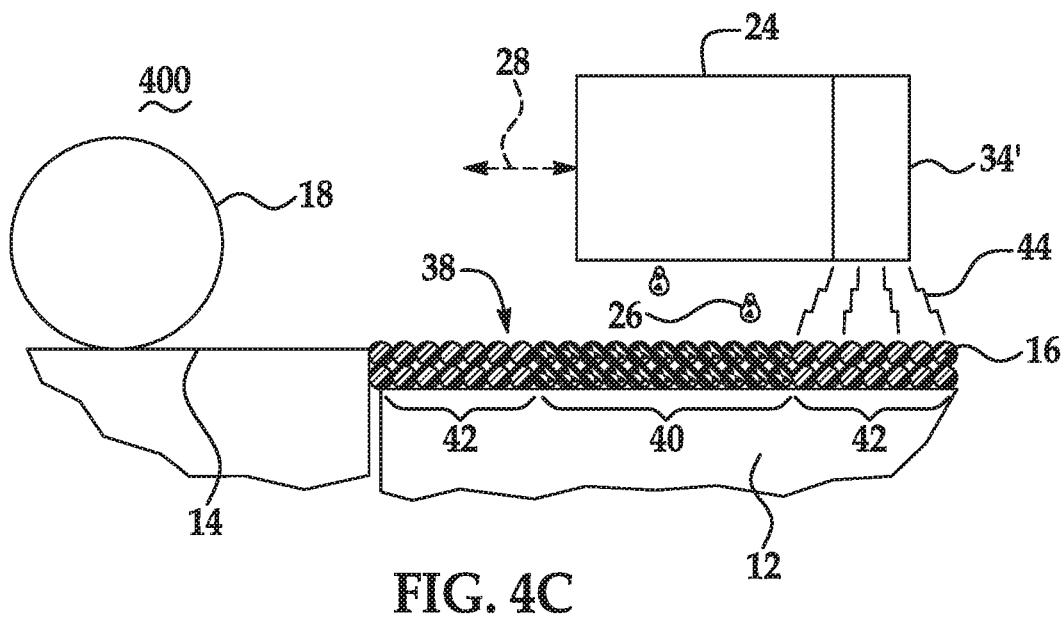

As shown at reference numeral 304 in FIG. 3 and in FIG. 4C, the method 300, 400 continues by, based on a 3D object model, selectively applying the liquid functional agent 26 on at least a portion 40 of the build material composition 16. In examples of the method 300, 400 where the liquid functional agent 26 is used to define the object/part being formed, the liquid functional agent 26 is a fusing agent and includes a radiation absorber as an active material. In these examples, the liquid functional agent 26 may be applied wherever it is desirable to fuse the layer 38. In examples of the method 300, 400 using SLS or SLM (which does not involve a radiation absorber), the liquid functional agent 26 may be a property-imparting agent that includes any material that will add a desired property to, or enhance a desired property in the layer of the 3D object being formed. Examples of the liquid functional agent are described below.

When the liquid functional agent 26 is selectively applied, the wetting modifying agent in the build material composition 16 controls the penetration of the liquid functional agent 26. In some examples, the wetting modifying agent prevents the liquid functional agent 26 (and thus, the active material) from penetrating beyond a fill volume of the build material composition 16 that corresponds to a portion of the 3D object model. In other examples, the wetting modifying agent causes the liquid functional agent 26 (and thus, the radiation absorber) to penetrate all or substantially all of a fill volume of the build material composition 16 that corresponds to a portion of the 3D object model.

In some examples, the wetting modifying agent changes the surface properties of the build material and thus changes how the build material interacts with the applied liquid. Depending upon the properties of the wetting modifying agent and the properties of the liquid functional agent, the interaction between the active material and the wetting modifying agent can reduce or prevent the liquid functional agent migration or can improve the liquid functional agent migration.

It is to be understood that a single liquid functional agent 26 may be selectively applied on the portion 40, or multiple liquid functional agents 26 may be selectively applied on the portion 40. As an example, multiple liquid functional agents 26 may be used to create a multi-colored part. As another example, one liquid functional agent 26 may be applied to an interior portion of a layer and/or to interior layer(s) of a 3D part, and a second liquid functional agent 26 may be applied to the exterior portion(s) of the layer and/or to the exterior layer(s) of the 3D part. In the latter example, the color of the second liquid functional agent 26 will be exhibited at the exterior of the part.

As illustrated in FIG. 4C, the liquid functional agent 26 may be dispensed from the applicator 24. The applicator 24 may be a thermal inkjet printhead, a piezoelectric printhead, a continuous inkjet printhead, etc., and the selectively applying of the liquid functional agent 26 may be accomplished by thermal inkjet printing, piezo electric inkjet printing, continuous inkjet printing, etc.

The controller 30 may process data, and in response, control the applicator 24 (e.g., in the directions indicated by the arrow 28) to deposit the liquid functional agent 26 onto predetermined portion(s) 40 of the build material layer 38 that are to become part of the 3D part, and in some instances, that are to exhibit a particular property. The applicator 24 may be programmed to receive commands from the controller 30 and to deposit the liquid functional agent 26 according to a pattern of a cross-section for the layer or a part of the layer of the 3D part that is to be formed. As used herein, the cross-section of the layer or part of the layer of the 3D part to be formed refers to the cross-section that is parallel to the surface of the build area platform 12. In the example shown in FIG. 4C, the applicator 24 selectively applies the liquid functional agent 26 on those portion(s) 40 of the build material layer 38 that is/are to become the first layer of the 3D part. As an example, if the 3D part that is to be formed is to be shaped like a cube or cylinder, the liquid functional agent 26 will be deposited in a square pattern or a circular pattern (from a top view), respectively, on at least a portion of the build material layer 38. In the example shown in FIG. 4C, the liquid functional agent 26 is deposited on the portion 40 of the build material layer 38 and not on the portions 42.

The volume of the liquid functional agent 26 that is applied per unit of the build material composition 16 in the patterned portion 40 depends, in part, on the active material in the liquid functional agent. For example, when the liquid functional agent 26 is a fusing agent, the volume that is applied may be sufficient to absorb and convert enough radiation 44 so that the build material composition 16 in the patterned portion 40 will fuse/coalesce. In this example, the volume of the liquid functional agent 26 that is applied per unit of the build material composition 16 may depend, at least in part, on the radiation absorber used, the radiation absorber loading in the liquid functional agent 26, and the build material composition 16 used. For another example, when the liquid functional agent 26 is a property-imparting agent, the volume that is applied may be sufficient to impart a desired level of the property (e.g., conductivity, ductility, etc.) to the build material composition 16 in the patterned portion 40. In this example, the volume of the liquid functional agent 26 that is applied per unit of the build material composition 16 may depend, at least in part, on the active material used, the active material loading in the liquid functional agent 26, and the build material composition 16 used.

Figure 4D:
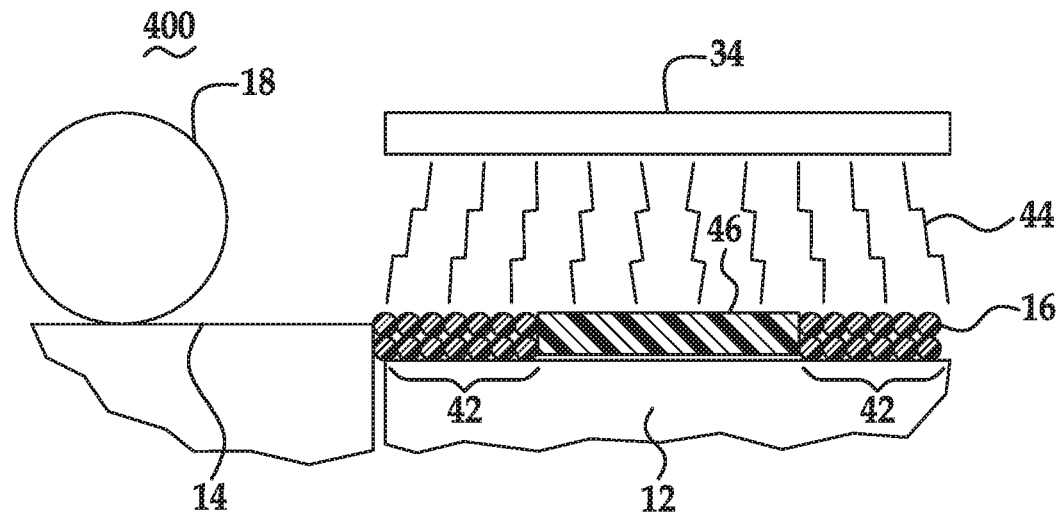

As shown at reference numeral 306 in FIG. 3 and FIGS. 4C and 4D, the method 300, 400 continues by forming a 3D part layer 46 from at least the portion 40 of the build material composition 16. The formation of the layer 46 may be based on a 3D object model of the final 3D part.

In one example of the method 300, 400, the liquid functional agent 26 is a property-imparting agent, and the forming of the layer 46 involves selectively laser sintering (SLS), based on the 3D object model, at least the portion 40. In these examples, an energy beam is used to selectively apply radiation to at least the portion 40 of the build material composition 16. This portion 40, when fused, will exhibit the property of the active material in the liquid functional agent 26. With SLS, it is to be understood that other portion(s) 42 may also be exposed to the energy beam. These other portion(s) 42 will fuse/sinter to become part of the 3D part layer 46, but will not exhibit the imparted property, as these portion(s) 42 have not been exposed to the liquid functional agent 26.

In SLS, the energy beam may be supplied from a source 34', which may be a tightly focused energy source, such as a laser, electron beam or microwave tip emitter.

The controller 30 may process data, and in response, control the source 34' of radiation (e.g., in the directions indicated by the arrow 28 and/or in directions along the X-axis) to apply radiation to the at least the portion 40 that is to exhibit a desirable property and that is to become part or all of the final 3D part layer 46. The source 34' may be attached to a scanning system that allows the source 34' to be moved into a desirable position so that the energy beam is selectively applied to at least the portion 40. In an example, the tightly focused energy source 34' and the scanning system may be attached to a moving XY stage or a translational carriage that moves them adjacent to the layer 38 in order to direct the energy beam in desirable area(s). Depending, in part, on the dimensions of the energy source 34' and the area of the build material composition 16 to be fused, the tightly focused energy source 34' may have to be moved in order to create the layer 46. For example, the source 34' may be programmed to receive commands from the controller 30 and to apply the radiation according to a pattern of a cross-section for the layer 46 of the final 3D object/part that is to be formed. The scanning system may move the source 34' into a suitable position with respect to the portion 40, and in some instances the portion 42, in order to create the layer 46. In other examples, the tightly focused energy source 34' and the scanning system may be fixed while a support member (similar to the build area platform 12) is configured to move relative thereto.

The amount of energy that is applied per unit of the build material composition 16 and/or the time of exposure may be sufficient to cause the build material composition 16 in the portion 40, and in some instances portion 42, to fuse. The amount of energy that is applied per unit of the build material composition 16 and/or the exposure time may depend, at least in part, on the source 34' of radiation used, the energy of the radiation applied, the wavelength of the radiation applied, and the build material 16 used.

The build material composition 16 that is exposed to energy from the tightly focused energy source 34' fuses. The selective application of the energy heats the build material composition 16. In an example, the selective application of the radiation sufficiently elevates the temperature of the build material composition 16 at the portion 40, and in some instances 42, above the melting or softening point of the particles, allowing fusing (e.g., coalescing, melting, binding, etc.) of the build material composition 16 to take place. The selective application of the radiation forms the fused layer 46, the portion(s) 40 of which exhibit the desired property.

In another example of the method 300, 400, the liquid functional agent 26 is a fusing agent, and the forming of the layer 46 involves exposing the build material composition 16 to radiation to fuse the at least the portion 40. The radiation 44 may be applied with the source 34 of radiation 44 as shown in FIG. 4D or with the source 34' of radiation 44 as shown in FIG. 4C.

In these examples, the fusing agent enhances the absorption of the radiation 44, converts the absorbed radiation 44 to thermal energy, and promotes the transfer of the thermal heat to the build material composition 16 in contact therewith. In an example, the fusing agent sufficiently elevates the temperature of the build material composition 16 in the layer 38 above the melting or softening point of the particles, allowing fusing (e.g., coalescing, thermal merging, melting, binding, etc.) of the build material composition 16 to take place. The application of the radiation 44 forms the fused layer 46, shown in FIG. 4D.

It is to be understood that portions 42 of the build material layer 38 that do not have the fusing agent applied thereto do not absorb enough radiation 44 to fuse/coalesce. As such, these portions 42 do not become part of the 3D part that is ultimately formed. The build material composition 16 in the portions 42 may be reclaimed to be reused as build material in the printing of another 3D part.

Figure 4E:
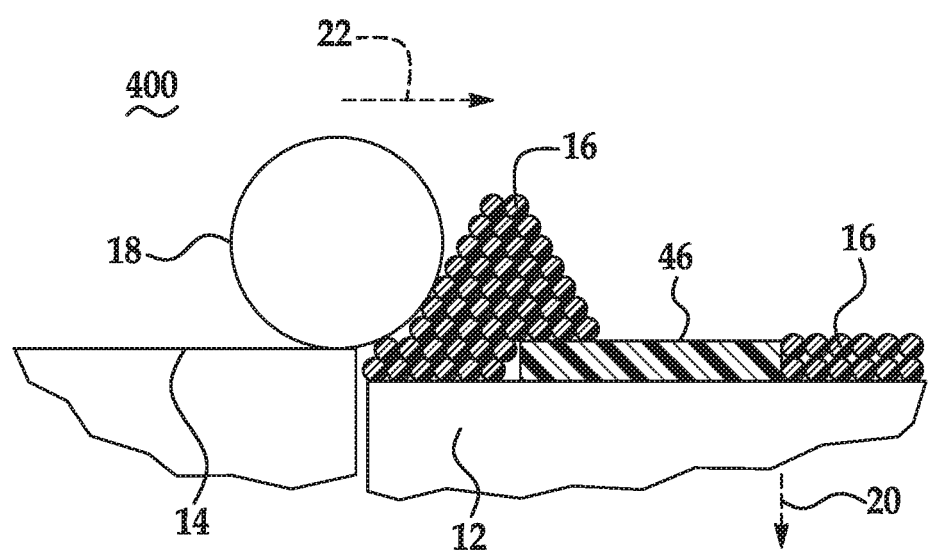

The processes shown or described in FIG. 3 and FIGS. 4A through 4D may be repeated to iteratively build up several fused layers and to form the 3D printed part. FIG. 4E illustrates the initial formation of a second build material layer on the previously formed layer 46. In FIG. 4E, following the fusing/coalescing of the predetermined portion(s) 40 (or in some examples of SLS, portions 40 and 42) of the build material composition 16, the controller 30 may process data, and in response cause the build area platform 12 to be moved a relatively small distance in the direction denoted by the arrow 20. In other words, the build area platform 12 may be lowered to enable the next build material layer to be formed. For example, the build material platform 12 may be lowered a distance that is equivalent to the height of the build material layer 38. In addition, following the lowering of the build area platform 12, the controller 30 may control the build material supply 14 to supply additional build material composition 16 (e.g., through operation of an elevator, an auger, or the like) and the build material distributor 18 to form another build material layer on top of the previously formed layer 46 with the additional build material composition 16. The newly formed build material layer may be in some instances pre-heated, patterned with the liquid functional agent 26, and then exposed to radiation 44 from the source 34, 34' of radiation 44 to form the additional fused layer.

Printing System

Figure 5:
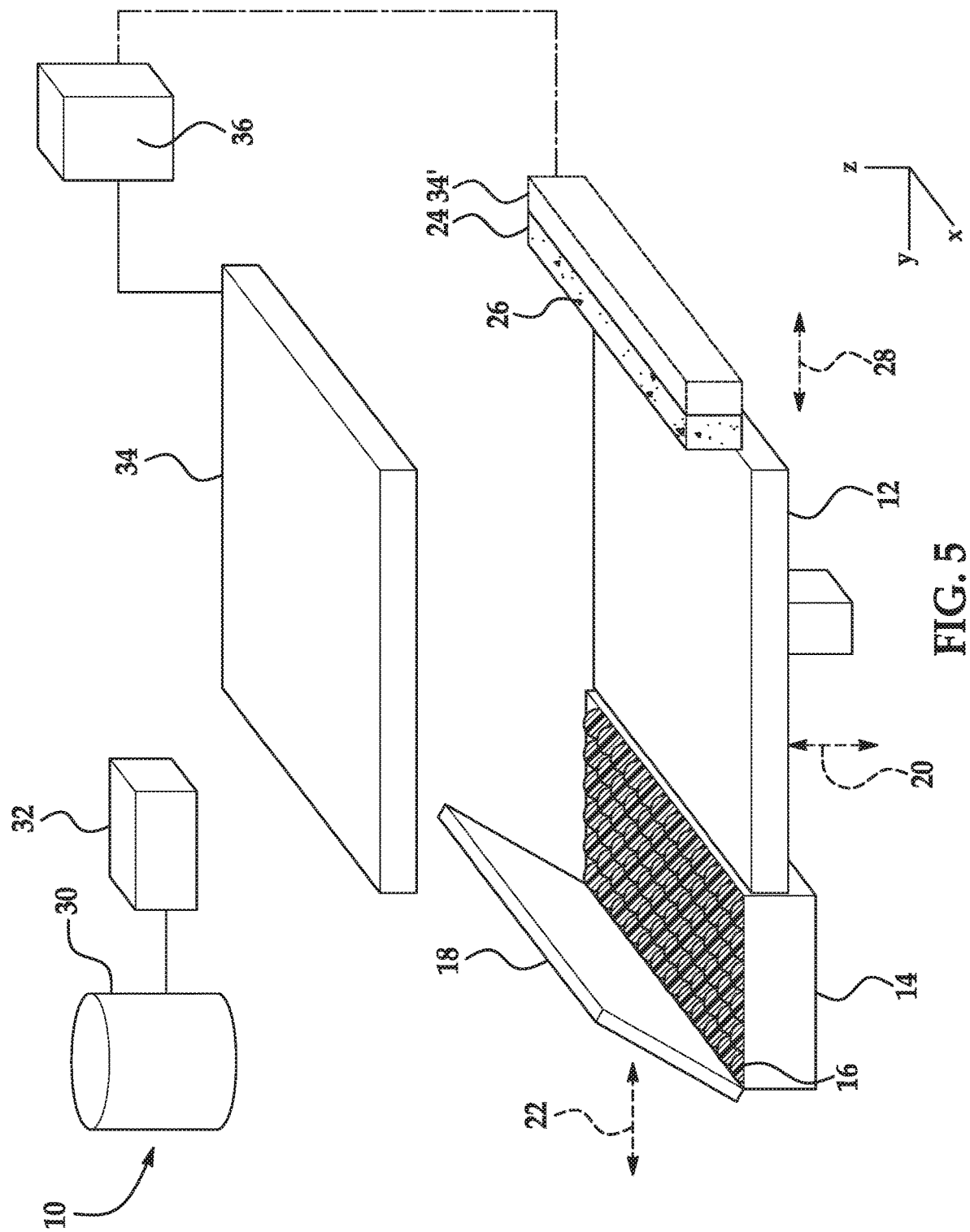
FIG. 5 is a schematic and partially cross-sectional view of an example of a 3D printing system disclosed herein.

Referring now to FIG. 5, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 5 may not be drawn to scale and thus, the 3D printing system 10 may have a different size and/or configuration other than as shown therein.

In an example, the three-dimensional (3D) printing system 10, comprises: a supply 14 of a build material composition 16 including polymeric or polymeric composite build material; and a wetting modifying agent, wherein the wetting modifying agent is: (i) incorporated into the polymeric component of the polymeric or polymeric composite build material and changes the wetting behavior of the polymeric component; or (ii) selected from the group consisting of: a fluorotelomer; a polymer having a chemical structure of the polymeric component of the polymeric or polymeric composite build material modified to include a hydrophobic group or a hydrophilic group; and a combination thereof; a build material distributor 18; a supply of a liquid functional agent 26; an applicator 24 for selectively dispensing the liquid functional agent 26; a source 34, 34' of radiation 44; a controller 30; and a non-transitory computer readable medium having stored thereon computer executable instructions to cause the controller 30 to: utilize the build material distributor 18 to dispense the build material composition 16; utilize the applicator 24 to selectively dispense the liquid functional agent 26 on at least a portion 40 of the build material composition 16; and utilize the source 34, 34' of radiation 44 to expose some or all of the build material composition 16 to radiation 44 to fuse at least the portion 40 of the build material composition 16.

As shown in FIG. 5, the printing system 10 includes the build area platform 12, the build material supply 14 containing the build material composition 16 including the polymeric or polymeric composite build material and the wetting modifying agent, and the build material distributor 18.

As mentioned above, the build area platform 12 receives the build material (without the wetting modifying agent) build material composition 16 from the build material supply 14. The build area platform 12 may be integrated with the printing system 10 or may be a component that is separately insertable into the printing system 10. For example, the build area platform 12 may be a module that is available separately from the printing system. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material or the build material composition 16 between the build material distributor 18 and the build area platform 12. In some examples, the build material supply 14 may include a surface upon which the build material or the build material composition 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material or the build material composition 16 from a storage location to a position to be spread onto the build area platform 12 or onto a previously formed layer 46 of the 3D part.

As also mentioned above, the build material distributor 18 may be a blade (e.g., a doctor blade), a roller, a combination of a roller and a blade, and/or any other device capable of spreading the build material composition 16 over the build area platform 12 (e.g., a counter-rotating roller).

As shown in FIG. 5, the printing system 10 also includes the applicator 24, which may contain the liquid functional agent 26. The applicator 24 may be scanned across the build area platform 12 in the directions indicated by the arrow 28, e.g., along the y-axis. The applicator 24 may be, for instance, a thermal inkjet printhead, a piezoelectric printhead, a continuous inkjet printhead, etc., and may extend a width of the build area platform 12. While the applicator 24 is shown in FIG. 5 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the liquid functional agent 26 over a large area of the build material composition 16. The applicator 24 may thus be attached to a moving XY stage or a translational carriage (neither of which is shown) that moves the applicator 24 adjacent to the build area platform 12 in order to deposit the liquid functional agent 26 in predetermined areas 40 of the build material layer 38 that has been formed on the build area platform 12 in accordance with the method 300, 400 disclosed herein. The applicator 24 may include a plurality of nozzles (not shown) through which the fusing agent 26 is to be ejected.

The applicator 24 may deliver drops of the liquid functional agent 26 at a resolution ranging from about 300 dots per inch (DPI) to about 1200 DPI. In other examples, the applicator 24 may deliver drops of the liquid functional agent 26 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. In some examples, the applicator 24 is able to deliver variable drop volumes of the liquid functional agent 26. One example of a suitable printhead has 600 DPI resolution and can deliver drop volumes ranging from about 6 pl to about 14 pl.

While not shown, some examples of the printing system 10 may also include a supply of the wetting modifying agent and a mechanism to selectively deliver the wetting modifying agent. The wetting modifying agent may be delivered via a liquid vehicle, and thus the mechanism may be similar to the applicator 24 described herein.

Each of the previously described physical elements may be operatively connected to a controller 30 of the printing system 10. The controller 30 may process print data that is based on a 3D object model of the 3D object/part to be generated. In response to data processing, the controller 30 may control the operations of the build area platform 12, the build material supply 14, the build material distributor 18, and the applicator 24. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system 10 components via communication lines.

The controller 30 manipulates and transforms data, which may be represented as physical (electronic) quantities within the printer's registers and memories, in order to control the physical elements to create the 3D part. As such, the controller 30 is depicted as being in communication with a data store 32. The data store 32 may include data pertaining to a 3D part to be printed by the 3D printing system 10. The data for the selective delivery of the build material composition 16, the liquid functional agent 26, etc. may be derived from a model of the 3D part to be formed. For instance, the data may include the locations on each build material layer 38 that the applicator 24 is to deposit the liquid functional agent 26. In one example, the controller 30 may use the data to control the applicator 24 to selectively apply the liquid functional agent 26. The data store 32 may also include machine readable instructions (stored on a non-transitory computer readable medium) that are to cause the controller 30 to control the amount of build material composition 16 that is supplied by the build material supply 14, the movement of the build area platform 12, the movement of the build material distributor 18, the movement of the applicator 24, etc.

As shown in FIG. 5, the printing system 10 may also include a source 34, 34' of radiation 44. In some examples, the source 34 of radiation 44 may be in a fixed position with respect to the build material platform 12. The source 34 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 34' of radiation 44 may be positioned to apply radiation 44 to the build material composition 16 immediately after the liquid functional agent 26 has been applied thereto. In the example shown in FIG. 5, the source 34' of radiation 44 is attached to the side of the applicator 24 which allows for patterning and heating/exposing to radiation 44 in a single pass.

In other examples (not shown), the source 34' of radiation may be a laser or other tightly focused energy source that may selectively apply energy to the layer 38 as previously described for SLS. The laser may emit light through optical amplification based on the stimulated emission of radiation. The laser may emit light coherently (i.e., constant phase difference and frequency), which allows the radiation to be emitted in the form of a laser beam that stays narrow over large distances and focuses on a small area. In some example, the laser or other tightly focused energy source may be a pulse laser (i.e., the optical power appears in pluses). Using a pulse laser allows energy to build between pluses, which enable the beam to have more energy. A single laser or multiple lasers may be used.

The source 34, 34' of radiation 44 may emit 44 having wavelengths ranging from about 100 nm to about 1 mm. As one example, the radiation 44 may range from about 800 nm to about 2 µm. As another example, the radiation 44 may be blackbody radiation with a maximum intensity at a wavelength of about 1100 nm. The source 34, 34' of radiation 44 may be infrared (IR) or near-infrared light sources, such as IR or near-IR curing lamps, IR or near-IR light emitting diodes (LED), or lasers with the desirable IR or near-IR electromagnetic wavelengths.

The source 34, 34' of radiation 44 may be operatively connected to a lamp/laser driver, an input/output temperature controller, and temperature sensors, which are collectively shown as radiation system components 36. The radiation system components 36 may operate together to control the source 34, 34' of radiation 44. The temperature recipe (e.g., radiation exposure rate) may be submitted to the input/output temperature controller. During heating, the temperature sensors may sense the temperature of the build material 16, and the temperature measurements may be transmitted to the input/output temperature controller. For example, a thermometer associated with the heated area can provide temperature feedback. The input/output temperature controller may adjust the source 34, 34' of radiation 44 power set points based on any difference between the recipe and the real-time measurements. These power set points are sent to the lamp/laser drivers, which transmit appropriate lamp/laser voltages to the source 34, 34' of radiation 44. This is one example of the radiation system components 36, and it is to be understood that other radiation source control systems may be used. For example, the controller 30 may be configured to control the source 34, 34' of radiation 44.

Liquid Functional Agents

In the examples of the method 300, 400 and the system 10 disclosed herein, the liquid functional agent 26 may be a dispersion including an active material dissolved or dispersed therein. The active material may be a radiation absorber, a material that can impart an electrical property, a material that can impart a physical property, or a material that can impart a mechanical property to the 3D object.

When the radiation absorber is included, the liquid functional agent 26 is a fusing agent, which may be a dispersion including the radiation absorber (i.e., one example of an active material). The radiation absorber may be any infrared light absorbing colorant. In an example, the active material is a near-infrared light absorber. Any near-infrared colorants, e.g., those produced by Fabricolor, Eastman Kodak, or Yamamoto, may be used in the fusing agent 26. As one example, the fusing agent may be a printing liquid formulation including carbon black as the active material. Examples of this printing liquid formulation are commercially known as CM997A, 516458, C18928, C93848, C93808, or the like, all of which are available from HP Inc. Other suitable active materials include near-infrared absorbing dyes or plasmonic resonance absorbers.

As another example, the fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

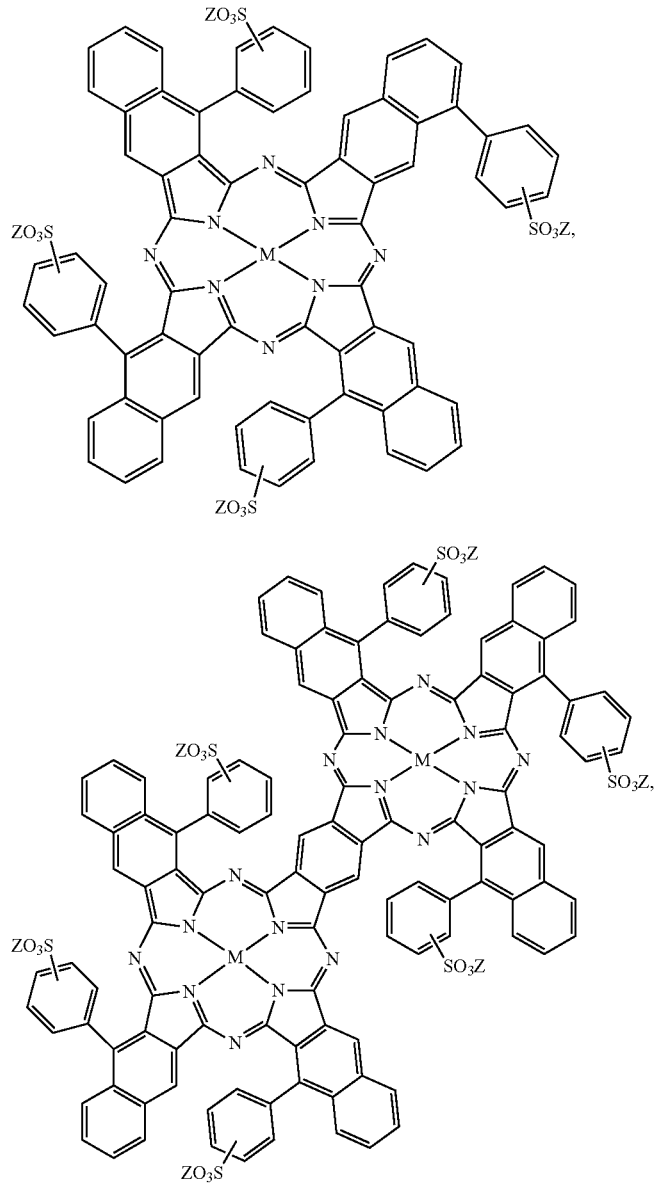

-continued

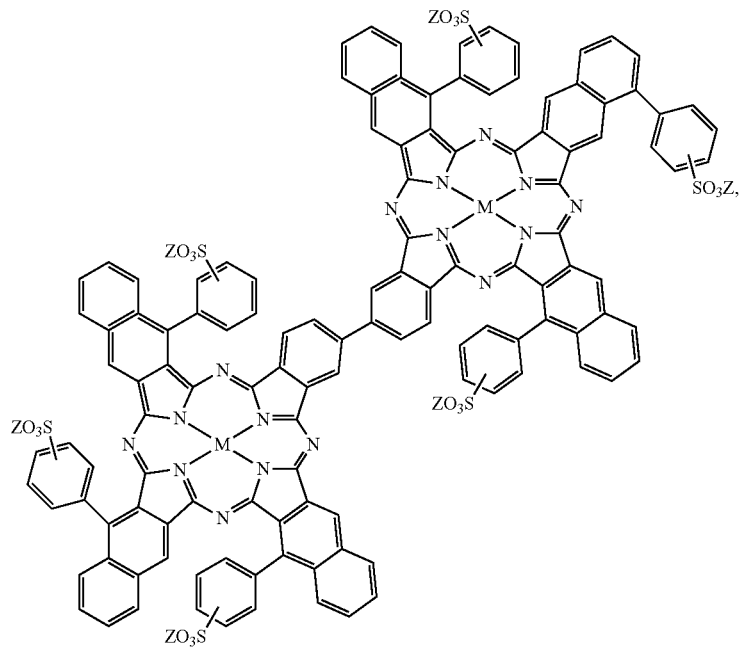

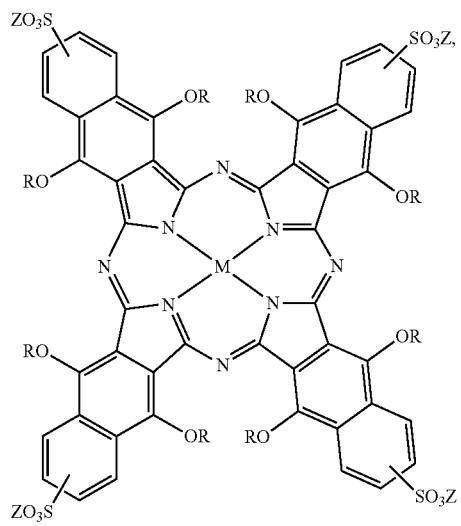

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

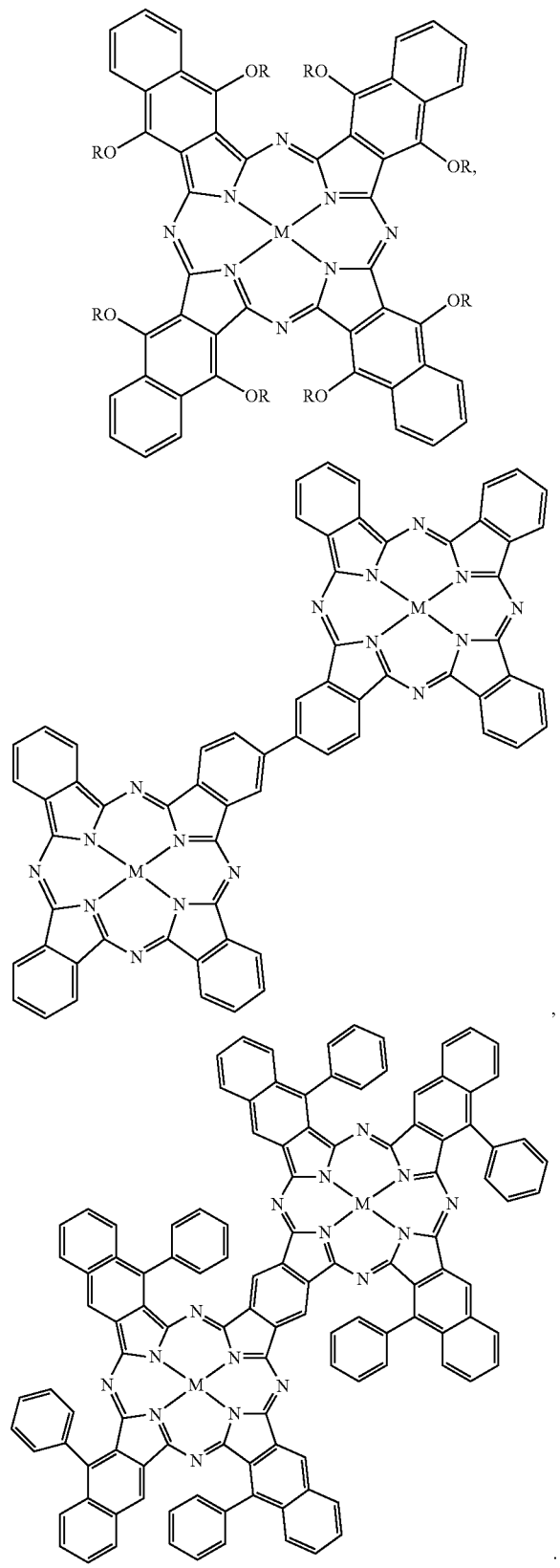

and mixtures thereof. For the hydrophobic near-infrared absorbing dyes, M can be a divalent metal atom (e.g., copper, etc.) or can include a metal that has Cl, Br, or OR' (R'=H, CH$_3$, COCH$_3$, COCH$_2$COOCH$_3$, COCH$_2$COCH$_3$) axial groups filling any unfilled valencies if the metal is more than divalent, and R can be hydrogen or any C$_1$-C$_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthraquinone dyes or pigments and metal (e.g., nickel) dithiolene dyes or pigments may have the following structures, respectively:

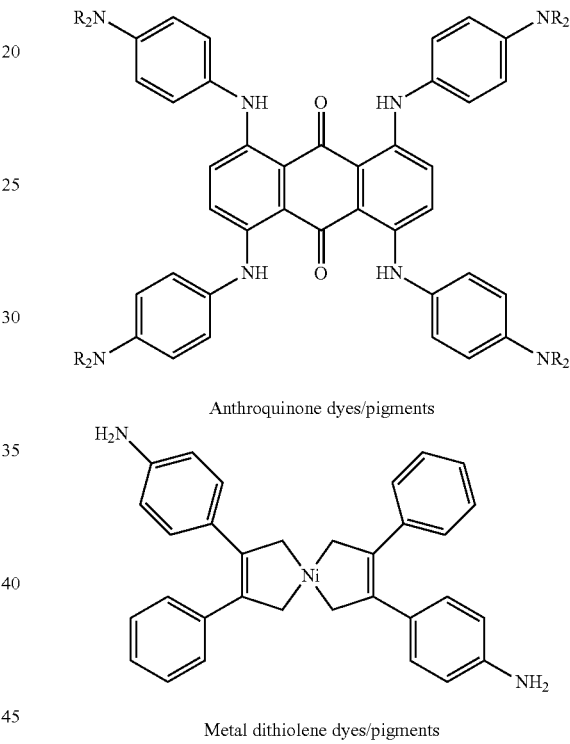

Anthroquinone dyes/pigments

Metal dithiolene dyes/pigments where R in the anthraquinone dyes or pigments may be hydrogen or any C$_1$-C$_8$ alkyl group (including substituted alkyl and unsubstituted alkyl).

Cyanine dyes or pigments and perylenediimide dyes or pigments may have the following structures, respectively:

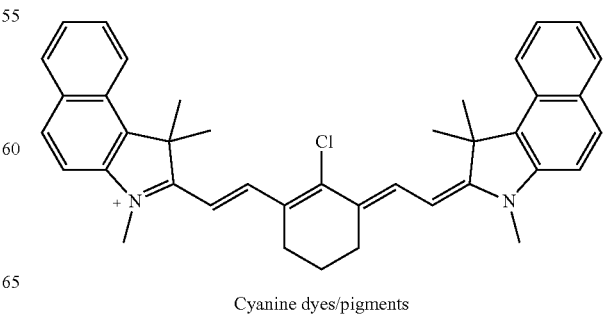

Cyanine dyes/pigments

-continued

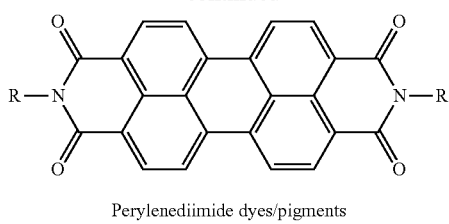

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

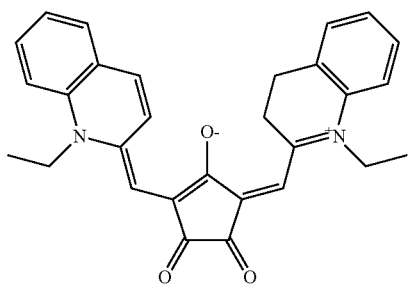

Croconium dyes/pigments

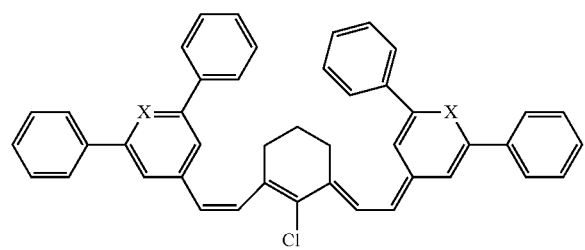

Pyrilium (X = O), thiopyrilium (X = S) dyes/pigments

Boron-dipyrromethene dyes or pigments and aza-boron-dipyrromethene dyes or pigments may have the following structures, respectively:

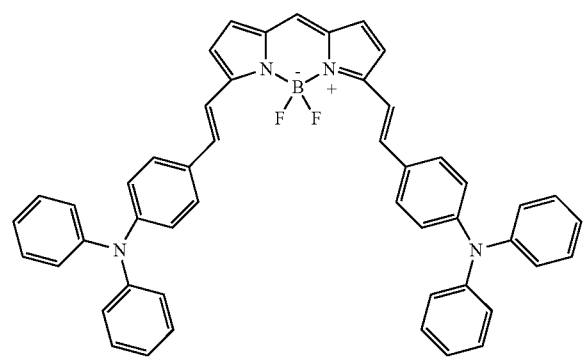

boron-dipyrromethene dyes/pigments

-continued

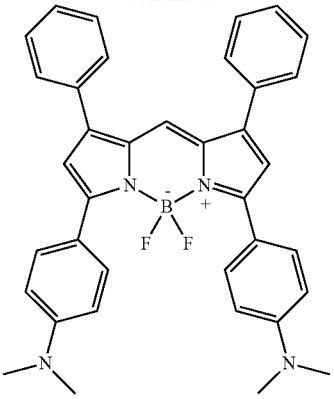

aza-boron-dipyrromethene dyes/pigments

In other examples, the active material may be a plasmonic resonance absorber. The plasmonic resonance absorber allows the fusing agent to absorb radiation at wavelengths ranging from 800 nm to 4000 nm (e.g., at least 80% of radiation having wavelengths ranging from 800 nm to 4000 nm is absorbed), which enables the fusing agent to convert enough radiation to thermal energy so that the build material composition 16 fuses/coalesces. The plasmonic resonance absorber also allows the fusing agent to have transparency at wavelengths ranging from 400 nm to 780 nm (e.g., 20% or less of radiation having wavelengths ranging from 400 nm to 780 nm is absorbed), which enables the 3D part to be white or slightly colored.

The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

When the liquid functional agent 26 is used to impart a particular property, the active material may be any material that will introduce that property to the build material composition 16 to which the active material is applied and/or will enhance that property in the build material composition 16 to which the active material is applied.

Examples of electronic property imparting materials include conductive materials, semi-conductive materials, and insulating materials.

Examples of the conductive material include transition metal (e.g., silver, copper, gold, platinum, palladium, chromium, nickel, zinc, tungsten, etc.) nanomaterials (e.g., nanoparticles, nanorods, nanowires, nanotubes, nanosheets, etc.), conductive oxides (e.g., indium tin oxide, antimony oxide, zinc oxide, etc.), conducting polymers (e.g., poly(3, 4-ethylenedioxythiophene) polystyrene sulfonate (PEDOT: PSS), polyacetylene, polythiophenes, any other conjugated polymer, etc.), carbonaceous nanomaterials (e.g., graphene (single or multi-layer), carbon-nanotubes (CNTs, single or multi-walled), graphene nanoribbons, fullerenes, etc.), and reactive metal systems.

Examples of the semi-conductive material that may be used in the liquid functional agent include semi-conducting nanomaterials (nanoparticles, nanorods, nanowires, nanotubes, nanosheets, etc.), semi-conducting metal oxides (e.g., tin oxide, antimony oxide, indium oxide, etc.), semi-conducting polymers (e.g., PEDOT:PSS, polythiophenes, poly (p-phenylene sulfide), polyanilines, poly(pyrrole)s, poly (acetylene)s, poly(p-phenylene vinylene), polyparaphenylene, and any other conjugated polymer, etc.), and semi-conducting small molecules (i.e., having a molecular mass less than 5,000 Daltons, e.g., rubrene, pentacene, anthracene, aromatic hydrocarbons, etc.). The previously described fullerenes, conducting or semi-conducting metal oxides, and conducting or semi-conducting polymers may be semi-conductive, in that they have a finite conductivity. However, this conductivity may often be sufficient for conductive applications. The material may be considered conductive or semi-conductive depending upon the geometry and/or in what combination with other electronic components it is utilized.

Examples of the insulating (dielectric) material that may be used include insulating nanomaterials (nanoparticles, nanorods, nanowires, nanotubes, nanosheets, etc.), colloids, or sol-gel precursors, such as hexagonal boron nitride, metal and semiconducting oxides, metal and semiconducting nitrides, metal oxide sol-gel precursors (e.g., metal alkoxides, metal chlorides, etc.), silicon sol-gel precursors (silicates), or solid electrolytes. Other examples of the insulating material include insulating polymers (e.g., polylactic acid, fluoropolymers, polycarbonate, acrylics, polystyrene, SU-8, etc.) and insulating small molecules (i.e., having a molecular mass less than 5,000 Daltons, e.g., benzocyclobutane, paraffins, organic dyes, etc.).

Examples of mechanical property imparting materials include any material that can alter the ductility of the 3D part, e.g., by increasing elongation at break, toughness, resilience, elongation at yield, or elongation at maximum stress in tension, compression, shear, or torsion. Examples of mechanical property imparting materials that may alter ductility (e.g., by increasing flexibility) include miscible solids selected from the group consisting of 2-methyl-benzene sulfonamide, a mixture of 4-methyl-benzene and 2-methyl-benzene sulfonamide, N-butylbenzenesulfonamide (BBSA), N-ethylbenzenesulfonamide (EBSA), N-propylbenzenesulfonam ide (PBSA), N-butyl-N-dodecylbenzenesulfonamide (BDBSA), N,N-dimethylbenzenesulfonamide (DMBSA), p-methylbenzenesulfonamide, o/p-toluene sulfonamide, p-toluene sulfonamide, 2-ethylhexyl-4-hydroxybenzoate, hexadecyl-4-hydroxybenzoate,1-butyl-4-hydroxybenzoate, dioctyl phthalate, diisodecyl phthalate, di-(2-ethylhexyl) adipate, tri-(2-ethylhexyl) phosphate, and combinations thereof. Other examples of mechanical property imparting materials include any material that can alter the mechanical strength of the 3D part, e.g., by increasing the rigidity. Examples of mechanical property imparting materials that may alter mechanical strength, e.g., by increasing rigidity, include metal oxides (e.g., ZnO, $Fe_3O_4$, $TiO_2$, $ZrO_2$, $MoO_3$, $WO_3$, etc.), graphene, carbon nanotubes, silicon, etc. The mechanical property imparting materials (e.g., metal oxides, carbon, silicon, etc.) may be in the form of nanofibers, nanorods, or nanowires.

Examples of physical property imparting materials include colorants.

The amount of the active material that is present in the liquid functional agent 26 ranges from greater than 0 wt % to about 75 wt % based on the total weight of the liquid functional agent 26. In other examples, the amount of the active material in the liquid functional agent 26 ranges from about 10 wt % to 40 wt %, from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the liquid functional agent 26 having jetting reliability and heat and/or radiation absorbance efficiency.

As used herein, "LFA vehicle" may refer to the liquid in which the active material is dispersed or dissolved to form the liquid functional agent 26. A wide variety of LFA vehicles, including aqueous and non-aqueous vehicles, may be used in the liquid functional agent 26. In some examples, the LFA vehicle may include water alone or a non-aqueous solvent alone with no other components. In other examples, the LFA vehicle may include other components, depending, in part, upon the applicator 24 that is to be used to dispense the liquid functional agent 26. Examples of other suitable liquid functional agent components include dispersant(s), silane coupling agent(s), co-solvent(s), surfactant(s), anti-microbial agent(s), anti-kogation agent(s), and/or chelating agent(s).

When the active material is the plasmonic resonance absorber, the plasmonic resonance absorber may, in some instances, be dispersed with a dispersant. As such, the dispersant helps to uniformly distribute the plasmonic resonance absorber throughout the liquid functional agent 26. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the liquid functional agent 26 may range from about 10 wt % to about 200 wt % based on the weight of the plasmonic resonance absorber in the liquid functional agent 26.

When the active material is the plasmonic resonance absorber, a silane coupling agent may also be added to the liquid functional agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the liquid functional agent 26 may range from about 0.1 wt % to about 50 wt % based on the weight of the plasmonic resonance absorber in the liquid functional agent 26. In an example, the total amount of silane coupling agent(s) in the fusing agent 26 ranges from about 1 wt % to about 30 wt % based on the weight of the plasmonic resonance absorber. In another example, the total amount of silane coupling agent(s) in the fusing agent 26 ranges from about 2.5 wt % to about 25 wt % based on the weight of the plasmonic resonance absorber.

The solvent of the liquid functional agent 26 may be water or a non-aqueous solvent (e.g., ethanol, acetone, n-methyl pyrrolidone, aliphatic hydrocarbons, etc.). In some examples, the liquid functional agent 26 consists of the active material and the solvent (without other components). In these examples, the solvent makes up the balance of the liquid functional agent 26.

Classes of organic co-solvents that may be used in a water-based fusing agent 26 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the liquid functional agent 26 in a total amount ranging from about 1 wt % to about 50 wt % based upon the total weight of the liquid functional agent 26, depending upon the jetting architecture of the applicator 24. In an example, the total amount of the co-solvent(s) present in the liquid functional agent 26 is 29 wt % based on the total weight of the liquid functional agent 26.

The co-solvent(s) of the liquid functional agent 26 may depend, in part upon the jetting technology that is to be used to dispense the liquid functional agent 26. For example, if thermal inkjet printheads are to be used, water and/or ethanol and/or other longer chain alcohols (e.g., pentanol) may be the main solvent (i.e., makes up 35 wt % or more of the fusing agent 26). For another example, if piezoelectric inkjet printheads are to be used, water may make up from about 25 wt % to about 30 wt % of the liquid functional agent 26, and the main solvent (i.e., 35 wt % or more of the liquid functional agent 26) may be ethanol, isopropanol, acetone, etc.

The LFA vehicle may also include humectant(s). In an example, the total amount of the humectant(s) present in the liquid functional agent 26 ranges from about 3 wt % to about 10 wt %, based on the total weight of the liquid functional agent 26. An example of a suitable humectant is LIPONIC® EG-1 (i.e., LEG-1, glycereth-26, ethoxylated glycerol, available from Lipo Chemicals).

In some examples, the LFA vehicle includes surfactant(s) to improve the jettability of the liquid functional agent 26. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TECO® Wet 510 (polyether siloxane) available from Evonik). In some examples, it may be desirable to utilize a surfactant having a hydrophilic-lipophilic balance (HLB) less than 10.

Whether a single surfactant is used or a combination of surfactants is used, the total amount of surfactant(s) in the liquid functional agent 26 may range from about 0.01 wt % to about 10 wt % based on the total weight of the liquid functional agent 26. In an example, the total amount of surfactant(s) in the liquid functional agent 26 may be about 3 wt % based on the total weight of the liquid functional agent 26.

An anti-kogation agent may be included in the liquid functional agent 26 that is to be jetted using thermal inkjet printing. Kogation refers to the deposit of dried printing liquid (e.g., liquid functional agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the liquid functional agent 26 may range from greater than 0.20 wt % to about 0.65 wt % based on the total weight of the liquid functional agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The LFA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the liquid functional agent 26 may include a total amount of antimicrobial agents that ranges from about 0.05 wt % to about 1 wt %. In an example, the antimicrobial agent(s) is/are a biocide(s) and is/are present in the liquid functional agent 26 in an amount of about 0.32 wt % (based on the total weight of the liquid functional agent 26).

Chelating agents (or sequestering agents) may be included in the LFA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the liquid functional agent 26 may range from greater than 0 wt % to about 2 wt % based on the total weight of the liquid functional agent 26. In an example, the chelating agent(s) is/are present in the liquid functional agent 26 in an amount of about 0.1 wt % (based on the total weight of the liquid functional agent 26).

To further illustrate the present disclosure, examples are given herein. It is to be understood that these examples are provided for illustrative purposes and are not to be construed as limiting the scope of the present disclosure.

EXAMPLES

Example 1

Three build materials were prepared. The first build material was a thermoplastic polyurethane powder. The second build material was a thermoplastic polyurethane powder, with talcum powder as a flow aid included in an amount ranging from greater than or equal to 0.1 wt % to less than 0.2 wt % (based on the total weight of the second build material). The thermoplastic polyurethane powder in the first build material had the chemical structure of the thermoplastic polyurethane powder in the second build material, except that the first build material was modified to include a hydrophobic group. The third build material was an example build material composition and included 1 wt % of the first build material and 99 wt % of the second build material (based on the total weight of the third build material).

A layer, with a thickness of about 500 µm, was formed with each of the three build materials. 10 µL of a hydrophilic fusing agent, including carbon black pigment as the radiation absorber, was applied on a portion of each layer. 10 µL of water was applied on another portion of each layer to compare degree of penetration between water and the fusing agent.

Some of the fusing agent and some of the water applied on the first build material did not penetrate the layer and formed a bead of liquid on the surface of the first build material. The beads that were formed had diameters similar to the drops of the fusing agent and the water that were applied, indicating that very little, if any, of the fusing agent or the water penetrated into the first build material. The diameter of the fusing agent on the first build material was 113 pixels. The diameter of the water on the first build material was 104 pixels.

For the second build material, all of the fusing agent penetrated the layer, while some of the water did not penetrate the layer and formed a bead of liquid on the surface. The white color of the second build material (rather than the black color of the fusing agent) was visible in some places where the fusing agent was pulled completely below the surface of the powder, which allowed the surface texture of the powder to become visible. The diameter of the fusing agent penetrated in the second build material was 228 pixels. This indicates that the fusing agent spread and excessively wetted the second build material. The diameter of the water on the second build material was 106 pixels.

Some of the fusing agent applied on the third build material penetrated the layer, while some of the fusing agent did not penetrate the layer and formed a bead of liquid on the surface of the third build material. The portion of the fusing agent that formed a bead had a diameter smaller than the drop of the fusing agent that was applied, indicating that more fusing agent penetrated into the powder compared to the amount that penetrated into the first build material layer. The diameter of the fusing agent on and in the third build material was 162 pixels, which was smaller than the diameter of the fusing agent on the second build material. This indicates that that the wetting was better controlled in the third build material than in the second build material.

These results indicate that the wetting behavior of build material can be modified. The first build material exhibited insufficient penetration of the fusing agent, and the second build material exhibited excessive penetration of the fusing agent. The example build material composition (the third build material) increased the penetration of the fusing agent as compared to the penetration of the fusing agent on the first build material and decreased the penetration of the fusing agent as compared to the penetration of the fusing agent on the second build material.

Example 2

Another example build material (referred to herein as "the fourth build material") was prepared. The fourth build material included the thermoplastic polyurethane powder of the first build material (from Example 1) and 1 wt % of SURFYNOL® surfactant SE-F (based on the total weight of the fourth build material). The first build material was surface treated with the SURFYNOL® SE-F surfactant to form the fourth build material. More particularly, the surfactant was mixed with the thermoplastic polyurethane powder in a ball mill, which is believed to embed the surfactant in and/or attach the surfactant to the surface of the first build material particles.

Samples of the first build material and the fourth build material were introduced into the flow channels of respective IBIDI® microslides. Each of the flow channels had a width of 5 mm, a length of 50 mm, and a depth of 800 μm. As such, the thickness of each sample was about 800 μm. Then, the fusing agent from Example 1 was applied at one end of each sample and allowed to flow into the powder.

The horizontal penetration length of the fusing agent (i.e., the horizontal distance that the fusing agent migrated from where the fusing agent was applied) was measured for each sample. The horizontal penetration length of the fusing agent in the layer of the first build material was 0 cm (i.e., no horizontal penetration was observed). The horizontal penetration length of the fusing agent in the layer of the fourth build material was about 3.8 cm.

These results also indicate that the wetting behavior of build material can be modified. The first build material exhibited insufficient penetration of the fusing agent, and the example build material composition (the fourth build material) increased the penetration of the fusing agent as compared to the penetration of the fusing agent on the first build material.

It is to be understood that the ranges provided herein include the stated range and any value or sub-range within the stated range. For example, from about 0.5 wt % to about 2 wt % should be interpreted to include not only the explicitly recited limits of from about 0.5 wt % to about 2 wt %, but also to include individual values, such as about 0.74 wt %, about 0.85 wt %, about 1.5 wt %, about 1.725 wt %, etc., and sub-ranges, such as from about 0.55 wt % to about 1.35 wt %, from about 1.15 wt % to about 1.5 wt %, from about 0.75 wt % to about 1.85 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A build material composition for three-dimensional (3D) printing, comprising:
   a polymeric or polymeric composite build material; and
   a solid wetting modifying agent mixed with the polymeric or polymeric composite build material, wherein the solid wetting modifying agent is:
   (i) present in the build material composition in an amount ranging from about 0.01 wt % to about 5 wt %, based on a total weight of the build material composition;
   (ii) a surfactant that is incorporated into a polymeric component of the polymeric or polymeric composite build material by being embedded in a surface of the polymeric component and changes the wetting behavior of the polymeric component; and
   (iii) selected from the group consisting of:
   a fluorotelomer;
   a C8-C20 alcohol;
   a methyltrialkyl ammonium chloride;
   docusate sodium salt;
   a polymer having a chemical structure of the polymeric component of the polymeric or polymeric composite build material modified to include a hydrophobic group or a hydrophilic group; and
   a combination thereof.

2. The build material composition as defined in claim 1 wherein the solid wetting modifying agent is selected from the group consisting of the fluorotelomer, the methyltrialkyl ammonium chloride, the docusate sodium salt, and a combination thereof.

3. The build material composition as defined in claim 1 wherein the solid wetting modifying agent is selected from the group consisting of silica nanopowder, polyvinyl alcohol, polyethylene glycol, and a combination thereof, and wherein the polymeric or polymeric composite build material is a powder material.

4. The build material composition as defined in claim 1 wherein the solid wetting modifying agent is the fluorotelomer, the C8-C20 alcohol, the methyltrialkyl ammonium chloride, the docusate sodium salt, or a combination thereof, and the amount ranges from about 0.01 wt % to about 0.05 wt %, based on the total weight of the build material composition.

5. The build material composition as defined in claim 1 wherein the solid wetting modifying agent is the polymer having the chemical structure of the polymeric component modified to include the hydrophobic group or the hydrophilic group, and the amount ranges from about 0.5 wt % to about 5 wt %, based on the total weight of the build material composition, and wherein the polymeric or polymeric composite build material is a powder material.

6. The build material composition as defined in claim 1 wherein the solid wetting modifying agent includes the polymer having the chemical structure of the polymeric component modified to include the hydrophobic group or the hydrophilic group, and the solid wetting modifying agent has an average particle size ranging from about 2 μm to about 200 μm, and wherein the polymeric or polymeric composite build material is a powder material.

7. The build material composition as defined in claim 1 wherein the polymeric component of the polymeric or polymeric composite build material is selected from the group consisting of polyamides, polyethylene, polyoxomethylene, polystyrene, polycarbonate, polyester, polyurethanes, and mixtures thereof.

8. A method of forming the build material composition for three-dimensional (3D) printing of claim 1, comprising:
mixing the surfactant, a solvent, and the polymeric component of the polymeric or polymeric composite build material, whereby the solvent softens the surface of the polymeric component and the surfactant becomes embedded in the softened surface of the polymeric component; and
then, removing the solvent.

9. A method of forming a build material composition for three-dimensional (3D) printing, comprising:
mixing a polymeric or polymeric composite build material with a solid wetting modifying agent, wherein the solid wetting modifying agent is:
(i) present in the build material composition in an amount ranging from about 0.01 wt % to about 5 wt %, based on a total weight of the build material composition;
(ii) a surfactant that is incorporated into a polymeric component of the polymeric or polymeric composite build material by being embedded in a surface of the polymeric component and changes the wetting modifying behavior of the polymeric component; and
(iii) selected from the group consisting of:
a fluorotelomer;
a $C_8$-$C_{20}$ alcohol;
a methyltrialkyl ammonium chloride;
docusate sodium salt;
a polymer having a chemical structure of a polymeric component of the polymeric or polymeric composite build material modified to include a hydrophobic group or a hydrophilic group; and
a combination thereof.

10. A method for three-dimensional (3D) printing, comprising:
applying a build material composition to form a layer, the build material composition including:
a polymeric or polymeric composite build material; and
a solid wetting modifying agent initially mixed with the build material as part of the build material composition; wherein the solid wetting modifying agent is a surfactant that:
(i) is present in the build material composition in an amount ranging from about 0.01 wt % to about 5 wt %, based on a total weight of the build material composition;
(ii) becomes incorporated into a polymeric component of the polymeric or polymeric composite build material by being embedded in a surface of the polymeric component and changes the wetting behavior of the polymeric component; and
(iii) is selected from the group consisting of:
a fluorotelomer;
a $C_8$-$C_{20}$ alcohol;
a methyltrialkyl ammonium chloride;
docusate sodium salt;
a polymer having a chemical structure of the polymeric component of the polymeric or polymeric composite build material modified to include a hydrophobic group or a hydrophilic group; and
a combination thereof;
based on a 3D object model, selectively applying a liquid functional agent on the at least the portion of the build material composition, wherein the solid wetting modifying agent controls the penetration of the liquid functional agent; and
based on the 3D object model, forming a 3D part layer from at least the portion of the build material composition.

11. The method as defined in claim 10 wherein:
the liquid functional agent is a fusing agent;
the solid wetting modifying agent controls penetration of the fusing agent into the build material composition; and
the forming of the 3D part layer involves exposing the build material composition to radiation to fuse the at least the portion to form a 3D part layer.

12. The method as defined in claim 10 wherein the solid wetting modifying agent one of:
prevents the liquid functional agent from penetrating beyond a fill volume of the build material composition that corresponds to a portion of the 3D object model; or
causes the liquid functional agent to penetrate all or substantially all of a fill volume of the build material composition that corresponds to a portion of the 3D object model.

* * * * *